(12) United States Patent
Klemencic

(10) Patent No.: US 9,181,930 B2
(45) Date of Patent: Nov. 10, 2015

(54) METHODS AND SYSTEMS FOR ELECTRIC POWER GENERATION USING GEOTHERMAL FIELD ENHANCEMENTS

(75) Inventor: Paul M. Klemencic, Seattle, WA (US)

(73) Assignee: Skibo Systems, LLC, Hillsboro, OR (US)

( * ) Notice: Subject to any disclaimer, the term of this patent is extended or adjusted under 35 U.S.C. 154(b) by 1405 days.

(21) Appl. No.: 12/562,080

(22) Filed: Sep. 17, 2009

(65) Prior Publication Data

US 2010/0071366 A1 Mar. 25, 2010

Related U.S. Application Data

(60) Provisional application No. 61/099,362, filed on Sep. 23, 2008.

(51) Int. Cl.
*F03G 7/00* (2006.01)
*F01K 27/00* (2006.01)
*F03G 7/04* (2006.01)

(52) U.S. Cl.
CPC . *F03G 7/04* (2013.01); *Y02E 10/10* (2013.01); *Y02E 10/34* (2013.01); *Y02E 10/46* (2013.01)

(58) Field of Classification Search
CPC ........ F03G 7/04; F28D 20/0052; Y02E 10/14
USPC ........... 60/641.1, 641.2, 641.3, 641.5, 641.15
See application file for complete search history.

(56) References Cited

U.S. PATENT DOCUMENTS

| | | | |
|---|---|---|---|
| 2,911,792 A | 11/1959 | Herre Rina | |
| 3,817,038 A | 6/1974 | Paull et al. | |
| 3,886,749 A | 6/1975 | Pacault | |
| 3,891,496 A | 6/1975 | Erwin | |
| 3,998,695 A | 12/1976 | Cahn et al. | |
| 4,003,786 A | 1/1977 | Cahn | |
| 4,074,754 A * | 2/1978 | Christian | 166/245 |
| 4,089,744 A | 5/1978 | Cahn | |
| 4,137,719 A | 2/1979 | Rex | |
| 4,146,057 A | 3/1979 | Friedman et al. | |
| 4,157,730 A * | 6/1979 | Despois et al. | 165/45 |
| 4,164,848 A | 8/1979 | Gilli et al. | |
| 4,173,125 A | 11/1979 | Bradshaw | |
| 4,223,729 A | 9/1980 | Foster | |

(Continued)

FOREIGN PATENT DOCUMENTS

| | | |
|---|---|---|
| GB | 1 524 236 | 9/1978 |
| JP | 2009-068459 | 4/2009 |
| WO | WO-2007/134466 | 11/2007 |

OTHER PUBLICATIONS

The PCT Search Report and Written Opinion dated May 6, 2010 for Application No. PCT/US2009/057353.

(Continued)

*Primary Examiner* — Kenneth Bomberg
*Assistant Examiner* — Jason Sheppard
(74) *Attorney, Agent, or Firm* — Foley & Lardner LLP

(57) ABSTRACT

Methods for increasing the enthalpy of a geothermal brine, methods for recovering heat enthalpy stored in a geothermal brine, and methods for the production of a heated brine from a natural geothermal reservoir are provided. The methods may be incorporated into a geosolar electric power generation project to provide a steady and flexible source of renewable energy from a geothermal heat source in combination with solar insolation.

49 Claims, 8 Drawing Sheets

(56) References Cited

U.S. PATENT DOCUMENTS

| | | | |
|---|---|---|---|
| 4,357,802 A | 11/1982 | Wahl et al. | |
| 4,364,232 A | 12/1982 | Sheinbaum | |
| 4,428,190 A | 1/1984 | Bronicki | |
| 4,577,679 A * | 3/1986 | Hibshman | 165/45 |
| 4,920,749 A | 5/1990 | Letarte | |
| 5,515,679 A | 5/1996 | Shulman | |
| 5,626,019 A | 5/1997 | Shimizu et al. | |
| 6,668,554 B1 | 12/2003 | Brown | |
| 7,096,665 B2 | 8/2006 | Stinger et al. | |
| 7,472,548 B2 | 1/2009 | Meksvanh et al. | |
| 8,739,512 B2 | 6/2014 | Mills | |
| 2004/0107700 A1 | 6/2004 | McClanahan et al. | |
| 2005/0126170 A1 | 6/2005 | Litwin | |
| 2005/0150226 A1 | 7/2005 | Perkins et al. | |
| 2006/0026961 A1 | 2/2006 | Bronicki | |
| 2006/0048770 A1 * | 3/2006 | Meksvanh et al. | 126/620 |
| 2007/0223999 A1 | 9/2007 | Curlett | |
| 2007/0227146 A1 | 10/2007 | Seidel | |
| 2008/0134681 A1 | 6/2008 | Nayef et al. | |
| 2008/0276616 A1 | 11/2008 | Flynn et al. | |
| 2009/0121495 A1 | 5/2009 | Mills | |
| 2009/0179429 A1 | 7/2009 | Ellis et al. | |
| 2010/0199669 A1 | 8/2010 | Gathmann | |
| 2010/0258760 A1 | 10/2010 | Bauer et al. | |
| 2010/0295306 A1 | 11/2010 | Ridnik et al. | |
| 2011/0016864 A1 | 1/2011 | Wright et al. | |
| 2011/0100005 A1 | 5/2011 | Sampson et al. | |
| 2011/0100611 A1 | 5/2011 | Ohler et al. | |
| 2011/0137480 A1 | 6/2011 | Sampson et al. | |
| 2011/0308249 A1 * | 12/2011 | Mandelberg et al. | 60/641.15 |
| 2012/0124998 A1 | 5/2012 | Newman | |
| 2013/0147197 A1 | 6/2013 | Goebel et al. | |

OTHER PUBLICATIONS

Non-Final Office Action on U.S. Appl. No. 13/636,332 Dated Jun. 19, 2014, 22 pages.

* cited by examiner

METHODS AND SYSTEMS FOR ELECTRIC POWER GENERATION USING GEOTHERMAL FIELD ENHANCEMENTS

CROSS-REFERENCE TO RELATED APPLICATIONS

This application claims priority to U.S. provisional application 61/099,362 filed Sep. 23, 2008 to Klemencic, which is hereby incorporated by reference in its entirety.

BACKGROUND

Various types of solar thermal electric power generation plants either already exist commercially or are in late developmental stages. These plants collect and concentrate solar energy (energy contained in sunlight) and convert the solar energy to thermal energy (heat). The thermal energy is then used to generate electric power.

Even in geographic locations that enjoy substantial, strong sunlight and relatively clear weather year-round, the available sunlight is often not sufficient to generate enough electricity to fully utilize, and maximize the economic investment in, a solar thermal plant. For example, solar thermal plants that lack thermal energy storage capabilities cannot generate electricity during nighttime or on overcast days. In addition, the number of hours of daylight are defined and constrained by season.

Some of these limitations can be overcome or lessened by storing thermal energy produced when sunlight is sufficient and recovering it to generate electricity when sunlight is unavailable or insufficient. The degree to which these limitations can be overcome or lessened, and the degree to which the overall utilization of the plant can be expanded, depend primarily on the amount of thermal storage available to the plant and the size of the solar energy collection field relative to the plant's electricity-generating capacity. Most of the thermal storage approaches that have been commercialized to date involve limited capacities that facilitate storage of thermal energy sufficient to operate the generators for four to six hours (Mills and Morgan, Aursa 2007). However, some studies suggest that it may be possible to store thermal energy for up to 16 hours (Stoddard et al., NREL 2006). This storage capacity allows a solar thermal plant to generate electricity into the late afternoon and evening hours or, at most, overnight, following a day of sufficient sunlight. However, it does not allow a plant to store thermal energy during a sunny season for electricity production during a less sunny season or during successive overcast days, or to continue operation during successive overcast days even in a season of normally strong sunlight.

Current methods of short-term thermal energy storage include steam accumulators, pressurized hot-water tanks, hot oil/rock storage vessels, and molten salt. These methods become costly when used to store more than a few hours worth of the heat needed for medium-size or larger electric power plants. In addition, none of these methods adequately addresses long-term, seasonal storage needs.

Geothermal reservoirs are also used to generate electricity. These reservoirs produce hot liquid brine, steam, or a mixture of brine and steam, depending on conditions in the reservoir, at a well-head or in a flash separator. A small minority of geothermal fields produce superheated "dry" steam, while most produce either hot brine or a combination of liquid brine with some flashed vapor, mostly steam. Because pressurized gaseous streams are ultimately used to drive turbine generators, the mass of produced geothermal fluid that can be used to drive a turbine is determined by the amount of the produced geothermal stream that is flashed into steam. Alternatively, the amount of electrical power that can be generated by a binary fluid geothermal power plant depends on the amount of heat that can be transferred from the produced geothermal stream to the binary fluid.

Geothermal power plants usually have fairly low thermal efficiencies relative to solar thermal plants and most other power plants, because of the lower-temperature fluids produced from most geothermal reservoirs. Even a stream produced from a highly efficient geothermal resource will normally flash steam with a temperature less than 450° F. (232° C.). An optimized steam Rankine-cycle power plant utilizing steam flashed from produced geothermal brine will typically enjoy a thermal efficiency of 25% or less, and such efficiency only applies to heat available in the flashed steam, typically less than a quarter of the total mass of the produced geothermal fluids. For this reason, many geothermal resources that might otherwise be considered potential sites for geothermal electric power production do not have sufficiently high thermal efficiency to result in an economically attractive project. Thus, many geothermal and hydrothermal reservoirs are not developed for electric power generation. The thermal energy otherwise available in such resources remains inaccessible from an economic standpoint and thus remains untapped.

Typically, geothermal power plants are fairly small, with the majority less than 100 MW in generating capacity, as a result of reservoir and other limitations. Despite current limitations in generating capacity, which result from a combination of the limitations of current methods, commercial considerations, and reservoir characteristics, many geothermal reservoirs contain a very large amount of thermal energy that could be extracted if the combination of technological and commercial considerations allowed, especially over a long period of time. The available geothermal heat per square mile of geothermal field associated with a 50° F. (28° C.) temperature change within the field (fluids and rock included) is over 190 trillion BTU per square mile. In an eight-square-mile geothermal structure, the available thermal energy could reach 1500 trillion BTU, the heat-equivalent of 1.5 TCF of natural gas. Thus, geothermal heat sources are potentially very, very large energy sources, if they can be tapped and utilized efficiently. Unfortunately, a substantial majority of these sources do not have the requisite temperatures and hydrothermal flows needed to economically sustain a geothermal power plant over a period of time sufficient to make such a project economically attractive. Thus, methods to efficiently access a greater portion of the immense thermal energy within a broad range of geothermal reservoirs would substantially increase society's ability to harness geothermal resources for electric power generation.

Anderson (1978) attempted to increase the overall efficiency of a geothermal power plant by segregating higher-temperature wells that produce more steam into a high-temperature gathering system and collecting lower-temperature geothermal fluids in a separate gathering system. In the geothermal electric power plant, the higher-temperature thermal energy is transferred by heat exchange into a dual power-fluid cycle, which improves the capability of the plant to efficiently generate electric power. Unfortunately, sizable geothermal reservoirs that are suitable for the segregation process of Anderson are rare, resulting in limited opportunities for the application of this process.

The rate at which heat and/or fluids can be withdrawn from geothermal hydrothermal reservoirs is also limited. If fluids are withdrawn too rapidly, then the pressure of the reservoir will normally drop unless replacement fluid flows to the production wells from elsewhere. Unfortunately, replenishment from deeper hot-water resources is often limited, if present at all, such that fluids flowing into production wells are replenished by colder fluids from the flanks of the reservoir, or are not replenished at all. The rate at which this colder fluid is heated by hot geothermal reservoir rock is limited by the rate of heat conduction through the rock itself. As a result, at high production rates, the reservoir pressure drops relatively rapidly because of incomplete fluid replenishment, and the temperature of the reservoir drops over time as colder fluid migrates to the production wells. The combination of lower reservoir pressure and temperature eventually reduces the fluid production rates and, to an even greater extent, the heat production levels, which in turn reduces the amount of power generated.

Spent geothermal brine has been injected into formations to replenish fluid flows to a production well in a geothermal reservoir. However, the spent geothermal brine is injected a great distance from the production well, for example, at least a mile away from production well, and is estimated to take in excess of 50 to 100 years to migrate back to the production well (NDC 1978). While this approach is acceptable for reducing temperature drops, it is ineffective for controlling the pressure drop in the production zone. However, the injection of spent brine in closer proximity to the production well is considered unacceptable because it would cool the produced fluids, thereby reducing the power-generating capability of the geothermal field.

It has also been suggested that supercritical brine could be used to enhance oil recovery and to create synthetic geothermal reservoirs from oil fields. Specifically, Meksvanh et al. (2006) describes a method for injecting a supercritical brine into porous or permeable geologic structures (e.g., sedimentary rock formations) for the purpose of enhancing oil recovery from oil fields. The resulting synthetic reservoirs can subsequently be used for thermal storage and electricity production. The Meksvanh method uses solar concentrators to heat reservoir brine directly to temperatures exceeding both the critical temperature and the critical pressure of the brine (374° C.; 22 MPa (3204 PSIA)). This process temperature is achievable by means of solar collectors, but at substantial cost. The supercritical brine is passed through the rock formations until equilibrium is reached between the supercritical brine and the rock formation, and until a relatively homogeneous temperature is reached throughout the reservoir. Unfortunately, injecting a supercritical brine into a much cooler geologic rock formation results in a loss of approximately half of the electrical generating capability initially and, therefore, a large loss in power-generating capability. Moreover, although the loss in power-generating capability will be reduced as the supercritical brine and the rock formation approach a state of thermal equilibrium, reaching such a state would take many years in the formations described in Meksvanh. For these reasons, the methods described by Meksvanh are not suitable for short-term solar energy storage or electrical power generation wherein the solar heat injected and stored is recovered and utilized within a short (e.g., one month or less) time frame.

The Meksvanh process also suffers from the problem that injection of heated fluids into porous and permeable rock formations can result in fluid and heat loss due to entrapment in fault blocks or selective transportation out of the injection zone of the reservoir through permeability streaks in the formation. There may also be heat losses to shallower sedimentary zones. There could even be a circulation of reservoir fluids with an influx of brine that together result in a cooling of the injection zone. These effects can further extend the time to reach thermal equilibrium, if it is possible to reach thermal equilibrium at all.

There have also been attempts to use solar energy to "augment" geothermal energy by heating geothermal fluids after they are produced from a reservoir. Rappoport (1978) uses heat-transfer fluids to collect geothermal heat from remote wells, then uses solar collectors to replenish heat lost from these streams in transit and to add heat to the heat-transfer fluid before utilizing the heat in a centralized geothermal power plant. In Meksvanh et al., produced brine from oilfields or other permeable reservoirs is heated to supercritical conditions in solar concentrators. Some of this supercritical brine may be used in a power plant. In both the Rappoport and Meksvanh processes, the radiative heat from solar concentrators is added directly to produced geothermal heat energy and then used for power generation.

SUMMARY

Methods for increasing the enthalpy of a geothermal brine are provided. In one embodiment, the methods for increasing the enthalpy of a geothermal brine include injecting a subcritical heated injection fluid into a geothermal reservoir containing a geothermal brine, wherein the enthalpy of at least a portion of the geothermal brine is increased to create a hot zone in the geothermal reservoir. In this embodiment, the enthalpy of the injection fluid is higher than that of the geothermal brine, desirably by a factor of less than 2, as measured using the enthalpy of saturated liquid water at 0° C. as a reference standard. The method may further include the step of recovering the geothermal brine from the hot zone of the geothermal reservoir. The geothermal brine can be recovered before the heated injection fluid and the geothermal brine reach thermal equilibrium. For example, in some embodiments, the geothermal brine is recovered within 30 days of the injection of the heated injection fluid. This includes embodiments wherein the geothermal brine is recovered within 2 weeks of the injection of the heated injection fluid, and further includes embodiments wherein the geothermal brine is recovered within 48 hours, or even within 24 hours, of the injection of the heated injection fluid.

The method for increasing the enthalpy of a geothermal brine may include the use of an injection fluid comprising a natural geothermal brine that has been previously recovered from a natural geothermal reservoir. The injection fluid may also comprise pressurized water or steam having a temperature of no greater than 374° C. The pressurized water or steam and the natural geothermal brine can be injected into the geothermal reservoir at alternating times.

The geothermal reservoir utilized in the methods of increasing the enthalpy of a geothermal brine can comprise substantially non-porous rock, such as igneous or metamorphic rock, as opposed to a porous rock, such as sedimentary rock. In some embodiments, the geothermal reservoir can be composed primarily of non-porous rock and can even be substantially free of, or contain only a minor portion of, porous rock.

The method may be expanded to include the step of producing electricity. For example, the recovered geothermal brine can be used as a thermal feed for a geothermal power plant to produce electricity. The method may further include injecting spent brine from the geothermal power plant into the geothermal reservoir, wherein the spent brine is injected into an outer zone that is outside of, and in fluid communication with, the hot zone, such that the injected spent brine is able to migrate into the hot zone and maintain the pressure within the geothermal reservoir. This outer zone can be configured such that the geothermal brine in the geothermal reservoir is replenished by the spent brine within 10 years.

The heated injection fluid used in the present methods can be heated, for example, via a transfer of heat from a heat transfer fluid, such as heat transfer fluid from a thermal power plant. Alternatively, the thermal power plant can be a solar thermal power plant, and the heated injection fluid can be heated via solar energy collected by solar concentrators. The heated injection fluid can also be heated, for example, via the transfer of heat from steam or a heat transfer fluid from the solar collectors.

In some embodiments, the heated injection fluid may be heated using heat transferred from thermal energy storage. Such storage may store heat taken from thermal power plants. In some cases, thermal energy storage may store heat converted from concentrated solar energy. After heat is transferred from thermal energy storage to the heated injection fluid, residual heat from the steam or heat transfer fluid may optionally be further used or recovered.

The processes for heating the injection fluids using thermal power plants can be combined with the above-mentioned step wherein spent brine from a geothermal power plant fed by natural geothermal brine is injected into the geothermal reservoir, wherein the spent brine is injected into an outer zone that is outside of, and in fluid communication with, the hot zone, such that the injected spent brine is able to migrate into the hot zone and maintain the pressure within the geothermal reservoir. In this latter embodiment, the thermal power plant can use, at least in part, the same type of power cycle as the geothermal power plant, and the power cycle working fluids from the thermal and geothermal power plants can be commingled and can feed a common power block.

In methods that include recovery of the geothermal brine from the hot zone, injection and recovery may be accomplished utilizing one or more injection and production wells having a variety of locations and geometries. For example, in one embodiment, the heated injection fluid is injected into a central region of the hot zone through a plurality of injection wells, and the geothermal brine is recovered from a peripheral region of the hot zone through a plurality of production wells, wherein the peripheral region peripherally surrounds the central region. Alternatively, the heated injection fluid can be injected into a higher region of the hot zone through a plurality of injection wells, and the geothermal brine can be recovered from a lower region of the hot zone through a plurality of production wells, wherein the lower region of the hot zone is deeper than the higher region. In some embodiments, the heated injection fluid is injected into and the geothermal brine recovered from the hot zone through one or more well sets, each well set comprising at least one injection well and at least one production well, wherein the injection well and the production well in each well set inject the injection fluid into, and recover the geothermal brine from, a single-fault block.

In some instances, such as when maximum production is desired, the heated injection fluid can be injected into the hot zone through one or more injection wells, and the geothermal brine can be subsequently recovered through the one or more injection wells, such that the one or more injection wells are converted from injection wells into production wells. This design allows for the short-term recovery of heat from the geothermal brine. For example, the geothermal brine can be recovered within 30 days of the injection of the heated injection fluid, or even within 48 hours of the injection of the heated injection fluid.

In some instances, the geothermal brine can be recovered through a plurality of production wells, at least two of which are configured to recover geothermal brine at different temperatures, different pressures, or both, and further wherein the geothermal brine recovered from each of the at least two production wells is fed separately as a thermal feed into a geothermal power plant.

In the present methods, steam that is flashed off the geothermal brine can be used directly or indirectly to provide an additional injection fluid. For example, the methods of increasing the enthalpy of a geothermal brine can include recovering and condensing steam flashed off the geothermal brine to produce water, heating the water, and injecting the heated water into the geothermal reservoir. Alternatively, the methods of increasing the enthalpy of a geothermal brine can include recovering and condensing steam flashed off the geothermal brine to produce water, using the water as feed water in a steam generator, and injecting steam generated by the steam generator into the geothermal reservoir.

In addition to methods for increasing the enthalpy of a geothermal brine, methods of recovering heat enthalpy stored in a geothermal reservoir are also provided. These methods include injecting a heated injection fluid into a geothermal reservoir containing geothermal brine, wherein the enthalpy of at least a portion of the geothermal brine is increased to create a hot zone in the geothermal reservoir, and recovering geothermal brine from the hot zone before the heated injection fluid reaches thermal equilibrium with the geothermal brine and the reservoir rock formation containing the geothermal brine. In some embodiments of such methods, heated injection fluid can be injected through an injection well and the geothermal brine can be recovered through the injection well, such that the injection well is converted from an injection well into a production well.

Methods for staging the production of hot zones in a geothermal reservoir are also provided. One example of such a method includes injecting a heated injection fluid into a first zone in a geothermal reservoir containing a geothermal brine, wherein the enthalpy of at least a portion of the geothermal brine is increased to create a first hot zone in the geothermal reservoir, and subsequently injecting a heated injection fluid into a second zone, located outside the first zone, in the geothermal reservoir, wherein the enthalpy of at least a portion of the geothermal brine is increased to create a second hot zone in the geothermal reservoir. In one embodiment of this method, heated geothermal brine from the first hot zone is recovered prior to injecting the heated injection fluid into the second hot zone. The heated injection fluid used in this method may be, but is not necessarily, a sub-critical heated fluid.

Methods for producing heated geothermal brines from a geothermal reservoir are also provided. Once example of such a method includes injecting a heated injection fluid into a natural geothermal reservoir containing a geothermal brine through at least one injection well, and subsequently recovering geothermal brine from the geothermal reservoir through the at least one injection well, such that the injection well is converted into a production well. The geothermal brine may be recovered within a short time after the injection of the heated injection fluid. For example, production of the geothermal brine may take place within 30 days, within 2 weeks, or even within 48 hours of injection. The heated injection fluid used in this method may be, but is not necessarily, a sub-critical heated fluid.

Systems for increasing the enthalpy of a geothermal brine, for staging the production of hot zones in a geothermal reservoir, and for producing heated geothermal brines from a geothermal reservoir are also provided. The various components of such systems correspond to the above-described methods. In one embodiment, the system includes a geothermal reservoir containing a geothermal brine, at least one hot zone injection well configured to inject a sub-critical heated injection fluid into the geothermal reservoir to create a hot zone in the geothermal reservoir, at least one production well configured to recover geothermal brine from the hot zone of the geothermal reservoir, and a source of sub-critical heated injection fluid in fluid communication with the at least one injection well. The source of sub-critical heated injection fluid can be a source of heated natural geothermal brine. The system can further include a source of at least one of heated pressurized water or steam. The system can also include a geothermal power plant configured to accept geothermal brine recovered from the geothermal reservoir as a thermal feed.

The system may also include at least one outer zone injection well configured to inject spent brine from the geothermal power plant into an outer zone in the geothermal reservoir, wherein the outer zone is outside of, and in fluid communication with, the hot zone, such that the injected spent brine is able to migrate into the hot zone and maintain pressure within the geothermal reservoir. Other optional components of the system include a thermal power plant (such as a solar thermal power plant) configured to heat an injection fluid to produce the sub-critical injection fluid via heat transfer from a heat transfer fluid. The thermal power plant and the geothermal power plant can be configured to use, at least in part, the same type of power cycle, and can be configured to commingle their power cycle working fluids and to feed said power cycle working fluids into a common power block.

In one embodiment, the system comprises a plurality of production wells, at least two of which are configured to recover geothermal brine at different temperatures, different pressures, or both, and further wherein the geothermal power plant is configured accept geothermal brine recovered from each of the at least two production wells as a separate thermal feed.

Further objects, features, and advantages of the invention will be apparent from the following detailed description when taken in conjunction with the accompanying drawings.

DETAILED DESCRIPTION

Figure 1:
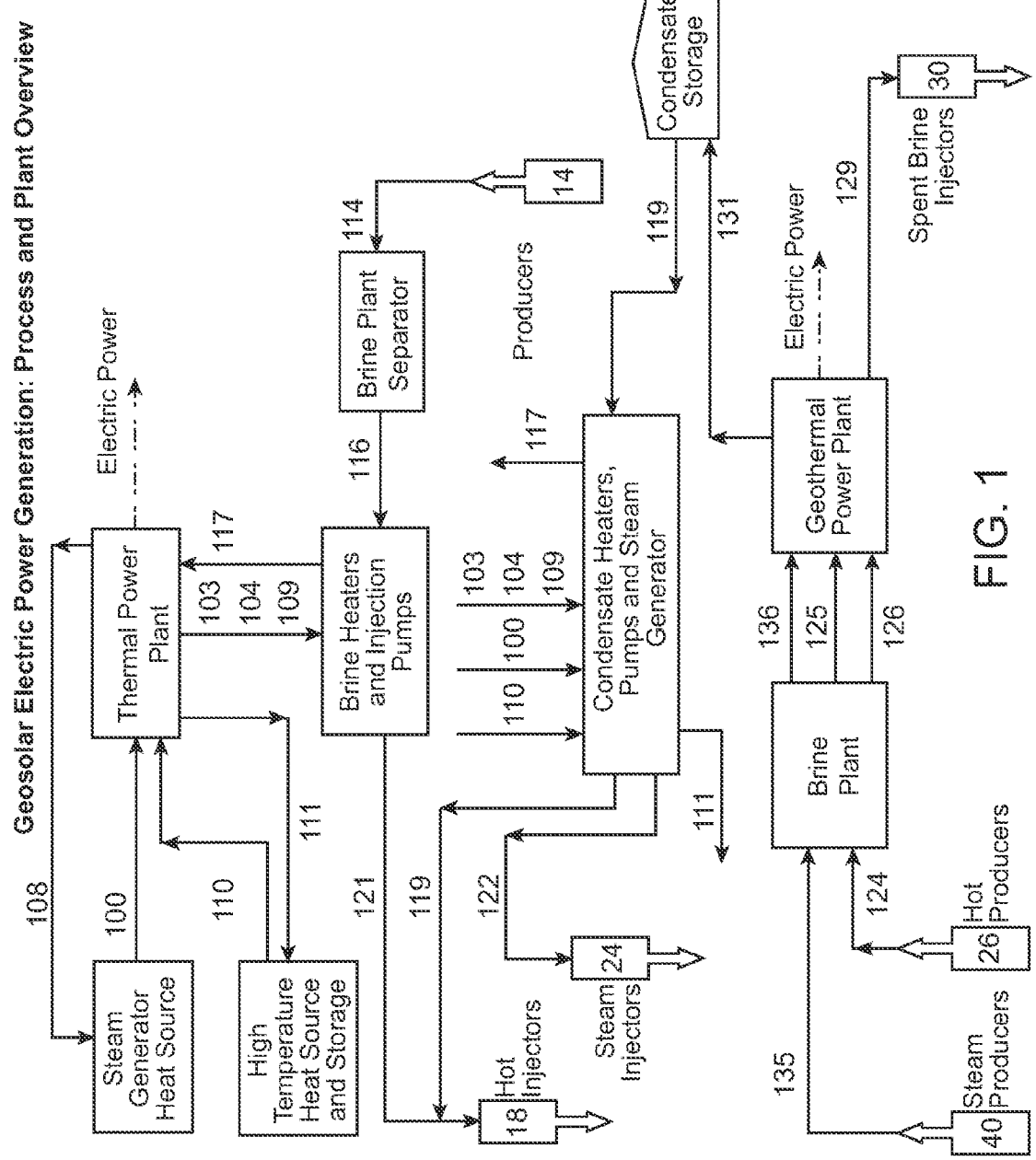
FIG. 1 is an overall block flow schematic diagram showing the various processes in a method for generating power using a geothermal brine with increased enthalpy.

Methods for increasing the enthalpy of a geothermal brine, methods for recovering heat enthalpy stored in a geothermal brine, methods for the production of a heated brine from a natural geothermal reservoir, and systems for carrying out the methods are provided.

In some embodiments, the methods involve the injection of a sub-critical heated injection fluid (i.e., a heated injection fluid that is below its critical temperature and pressure) into a reservoir fluid (typically brine) in a geothermal reservoir to raise the enthalpy of the reservoir fluid. The methods can be used to quickly and efficiently produce a reservoir fluid at any time (on demand), which can be used to generate power in a geothermal power plant. Using the present methods, geothermal reservoirs that contain fluids at temperatures and depths that are not otherwise conducive to power generation in an economically viable or attractive way can be made into economically attractive electric power generators.

When solar energy is used (directly or indirectly) to heat the injection fluids and the produced reservoir fluids are used to generate electric power, the process may be called 'geosolar electric power generation', or simply 'geosolar' (when used in a context that implies electric power generation), a term which describes the combination of solar thermal energy collection and storage with geothermal energy recovery in accordance with the present methods. Thus, the use of the term 'geosolar' in the context of this disclosure is distinguishable from previous uses of the term which refer to the storage of solar heat in shallow, below-ground wells for the purpose of space heating, rather than electric power generation.

Notably, adding heat to an underground heat reserve runs counter to conventional wisdom if the ultimate goal is the recovery of the added heat and utilization of that heat for electric power generation. Thermal energy can only be transferred from a hotter source to a colder sink. Therefore, adding heat to a colder sink reduces the energy available to generate power from that heat and, therefore, reduces the electrical energy that can be generated from the resulting thermal energy. However, if carefully controlled, the addition of heat to geothermal reservoir fluids, and the subsequent recovery and utilization of the heat for electric power generation, can be accomplished in a way that reduces, and/or minimizes, thermal energy loss as well as the corresponding loss in electric power that can be generated from the heat.

In the present methods, the loss in electric power generating capability of heat added to an injection fluid and stored in a geothermal reservoir brine is reduced by creating a system in which the electric energy that can ultimately be generated from the heat recovered from the reservoir brine is almost equal to the energy that could have been generated from the heat initially injected into the reservoir. Minimizing this loss can be accomplished by using heat sources (e.g., heat transfer fluids, or other sources used to heat the injection fluids) that are only somewhat higher in temperature than the heated injection fluids.

Naturally-occurring geothermal reservoir fluids that have been previously recovered from a natural geothermal reservoir are well-suited for use as the injection fluids in the present methods. The use of natural reservoir fluids is advantageous because the generation of electricity from recovered reservoir fluids can be derived from the pre-existing, naturally-occurring geothermal reservoir heat since a significant fraction of the generated power can come from natural geothermal reservoir heat, with the rest from heat added by the injected heated reservoir fluid. As described in greater detail below, the method can be optimized to allow recovery of stored energy without significant losses and to allow naturally-occurring geothermal energy to be produced and used to generate power at the same time. In many contemplated applications, the geothermal resource could not otherwise be produced economically because of the low temperatures of produced reservoir fluids.

In one embodiment, the method of present invention includes three general steps, although other embodiments of the methods do not necessarily include each of these steps. The three steps are: (1) heat generation for utilization in a thermally-driven power source; (2) the use of heat from the thermally-driven power source to heat an injection fluid for injection into a geothermal reservoir; and (3) the use of produced reservoir fluids (e.g., brine) to generate electricity in a geothermal power plant, with the optional remote re-injection and migration of spent brine from the geothermal power plant back into the geothermal reservoir. Systems incorporating components adapted to carry out these steps are also provided.

In the discussion that follows, the present methods and systems are described with respect to an illustrative method and system that includes each of the above-mentioned steps. However, it should be understood that the present invention also encompasses methods and systems that do not include all of the steps and/or components described below. In addition, the specific components described below may be replaced with other components designed to carry out the same function or operation.

FIG. 1 illustrates one non-limiting example of a method of increasing the enthalpy of a natural geothermal reservoir brine. This example includes the following steps: (1) production of geothermal reservoir fluids (e.g., "fresh brine") from a naturally-occurring geothermal reservoir; (2) generation of heat from solar concentrators and/or various other sources or fuels and utilization of the heat in a solar thermal power plant; (3) extraction of excess heat from the solar thermal power plant (or other source) to heat the produced geothermal reservoir fluids to a temperature greater than that of the naturally-occurring reservoir fluid; (4) injection of the heated reservoir fluid back into the geothermal reservoir through hot injection wells to form a hot zone in the geothermal reservoir; (5) recovery of heated geothermal reservoir fluids from the hot zone through either hot injection wells (acting as production wells) or hot production wells; (6) utilization of the recovered reservoir fluids in a geothermal power plant to produce electricity; and (7) injection of spent brine from the geothermal power plant back into the geothermal reservoir through remote spent brine injection wells. The optimization of operating temperatures, flows, and heat-transfer strategy throughout this process can result in efficient overall operation and facilitate the capture of a substantial portion of the original geothermal reservoir thermal energy that would be inaccessible with previously-known processes from an economic standpoint.

FIG. 1 schematically shows some process steps and plant elements that can be used to carry out one embodiment of the method described above. There are essentially three main sections to the schematic drawing. The top section illustrates heat collection or generation and subsequent utilization in a thermal power plant. (In this embodiment, for simplicity, steam is discussed as the working fluid in the thermal power plant, but other power-cycle fluids could be used.) The middle section shows heat from the thermal power plant used to heat produced geothermal brine or condensate hot water for injection into a geothermal reservoir, as well as an option for using additional heat from the heat sources to generate steam for injection. The bottom section shows heated reservoir fluids being produced from the reservoir, separated in a brine plant, and used in a geothermal power plant to generate electricity, as well as the re-injection and migration of the spent brine from a brine plant back to the reservoir.

In greater detail, FIG. 1 shows a heat source (steam generator) that generates steam 100 for delivery to a thermal power plant, where a high-temperature heat transfer fluid 110 can be used to superheat the steam. Solar concentrators can be used to generate the high-temperature heat. The thermal power plant utilizes the steam to generate electric power, sends heated boiler feed water 108 back to the steam generator and returns heat transfer fluid 111 to the high-temperature heat source. (Although the power plant is illustrated here as using a conventional Rankine cycle with steam as a working fluid, other types of power cycles or working fluids could also be used.)

Hot steam bleeds 103,104, and 109 from power turbine interstages of the thermal power plant are sent to brine heaters and condensate heaters. Cooler condensed steam (water) 117 from the brine heaters is trapped from these heaters and returned to the thermal power plant. Produced reservoir fluids 114 recovered from a geothermal reservoir via production wells 14 are separated in a brine plant separator, and the produced brine 116 is pumped to injection pressure and heated in the brine heaters. Thus, the present geosolar electric power generation methods can include the ability to use interstage steam to heat geothermal brine for injection into a geothermal reservoir and for the subsequent recovery of heat and power. This reduces the amount of interstage reheating and superheating needed in the thermal power plant, because a significant portion of the working fluid that would require reheating prior to the lower pressure stages of the turbine, will be used in the brine heaters instead. Thus a smaller high-temperature heat source (than would otherwise be necessary) is able to provide enough superheat and reheat for the geosolar thermal power plant.

The partial bleeds of lower-pressure steam (working fluid vapor) from the interstages of the turbine can be used to heat the fresh geothermal brine in heat exchangers. The brine heaters can be arranged, for example, in a countercurrent configuration such that brine is heated at each stage by steam condensing within, for example, 80° F. of the brine temperature at that point, and optionally with even less of a temperature differential between the condensing working fluid and the geothermal brine.

At least a portion of the resulting heated brine 121 is injected into the geothermal reservoir using hot injection wells 18, thereby increasing the enthalpy of at least a portion of the geothermal brine in the reservoir to create a hot zone. The optimal injection temperature will depend on the reservoir characteristics, such as original temperature and pressure and rock-formation heat transfer, as well as prior injected-heat cycling, and solar thermal power cycle optimization. In some embodiments, the heated-brine injection temperature can be about 400° F. to 500° F., although after repeated heat-cycling, this temperature could be raised. When injected, the hotter injected fluids will mix with cooler reservoir geothermal brine, resulting in a mixed-fluid enthalpy lower than the injected-fluid enthalpy. The enthalpy could be further reduced as a result of heat loss to the surrounding rock. However, after repeated cycling of heated injection fluids, the heat loss to the rock should be reduced significantly as a result of less heat transfer to the reservoir rock matrix around fractures in the hot injection wells.

If the geosolar project includes steam injection in addition to heated brine injection, geothermal steam condensate 131 can be collected in condensate storage. Condensate 119 is later pumped to injection pressure and heated in condensate heaters, utilizing appropriate stream bleeds from the thermal power plant. The heated geothermal condensate can be boiled to generate steam using, for example, steam 100 or high-temperature heat-transfer fluid 110. At least a portion of the steam generated from geothermal condensate 122 can be injected into steam injection wells 24. (Although the hot brine injectors and the steam injections are shown as separate in FIG. 1, the same injection wells may be used to alternately inject brine and steam.) Steam can also be sent to the thermal power plant to make-up the working fluid. If steam is injected, then steam injection wells 24 could be reversed within, for example, 1-14 days, and steam 135 could be produced from steam production wells 40 and sent to the geothermal power plant.

If steam is used as an injection fluid, industry experience with steam injection in oilfields (involving similar depths of the steam injection zone, e.g., about 2000-4000 feet) can help guide operation. After the reservoir formation has been heated by virtue of previous injections, these fields should not experience steam condensation or collapse of the "steam chest" within the short time periods contemplated in the present methods. Typically it will take more than four weeks for a steam chest to collapse, whereas in the present method utilizing steam injection, steam can be recovered by converting the injection wells into production wells within, for example, seven days.

Subsequent to the injection of the heated injection fluid, heated geothermal reservoir fluids can be produced. For the hot production wells, the produced geothermal reservoir fluid temperature will be determined by the injected brine temperature and the length of time the heated fluid has resided in the geothermal reservoir, which in turn will partly impact the heat loss and temperature drop of injected fluid prior to production and recovery. If the hot production wells are operated such that there is significantly more fluid produced than injected, the produced reservoir fluids will be a mixture of heated injected fluids with fresh brine. The mixed enthalpy of the produced fluids will fall somewhere between the injected hot fluid enthalpy and the fresh brine enthalpy. Another potential advantage of the present geosolar geothermal reservoirs is the capability of the wells to produce at higher flow rates into a higher pressure brine separator. Since the bottom-hole temperature and enthalpy is higher after heated injection fluid is introduced into the reservoir, the hot producers are generally better suited for use in a higher pressure brine separator than the naturally occurring fresh brine would be.

Heated fluids 124 from hot production wells 26 (i.e., production wells that recover geothermal brine from the hot zone in the geothermal reservoir) are separated in the brine plant and the flashed steam 125 and hot brine 126 are sent to the geothermal power plant, desirably, but not necessarily, to separate power cycles. Within the geothermal power plant, the different steam feeds, and the hot brine, can be used to generate power. Typically, the wellhead conditions for these fluids are well below either the brine or water critical temperature and pressure. For example, the wellhead conditions may range from 1000 PSIA and 540° F. (conditions most likely resulting from reversing steam injectors—see discussion below) down to 50 PSIA and 280° F., when naturally-occurring fresh geothermal brine is produced. The pressure and temperature could be even lower in situations where brine is needed to feed the geosolar process.

The geothermal power plant shown in FIG. 1 is desirably, but not necessarily, a separate facility from the thermal power plant, although they may share some common elements, or in some embodiments, be extensively integrated.

Condensed steam 131 can be sent to storage, and the spent brine 129 can be re-injected remotely into spent brine injection wells 30 which lie outside of the hot zone in the geothermal reservoir. Eventually (e.g., within a period of 2 to 10 years) the re-injected spent brine can migrate back to the hot zone.

Figure 2:
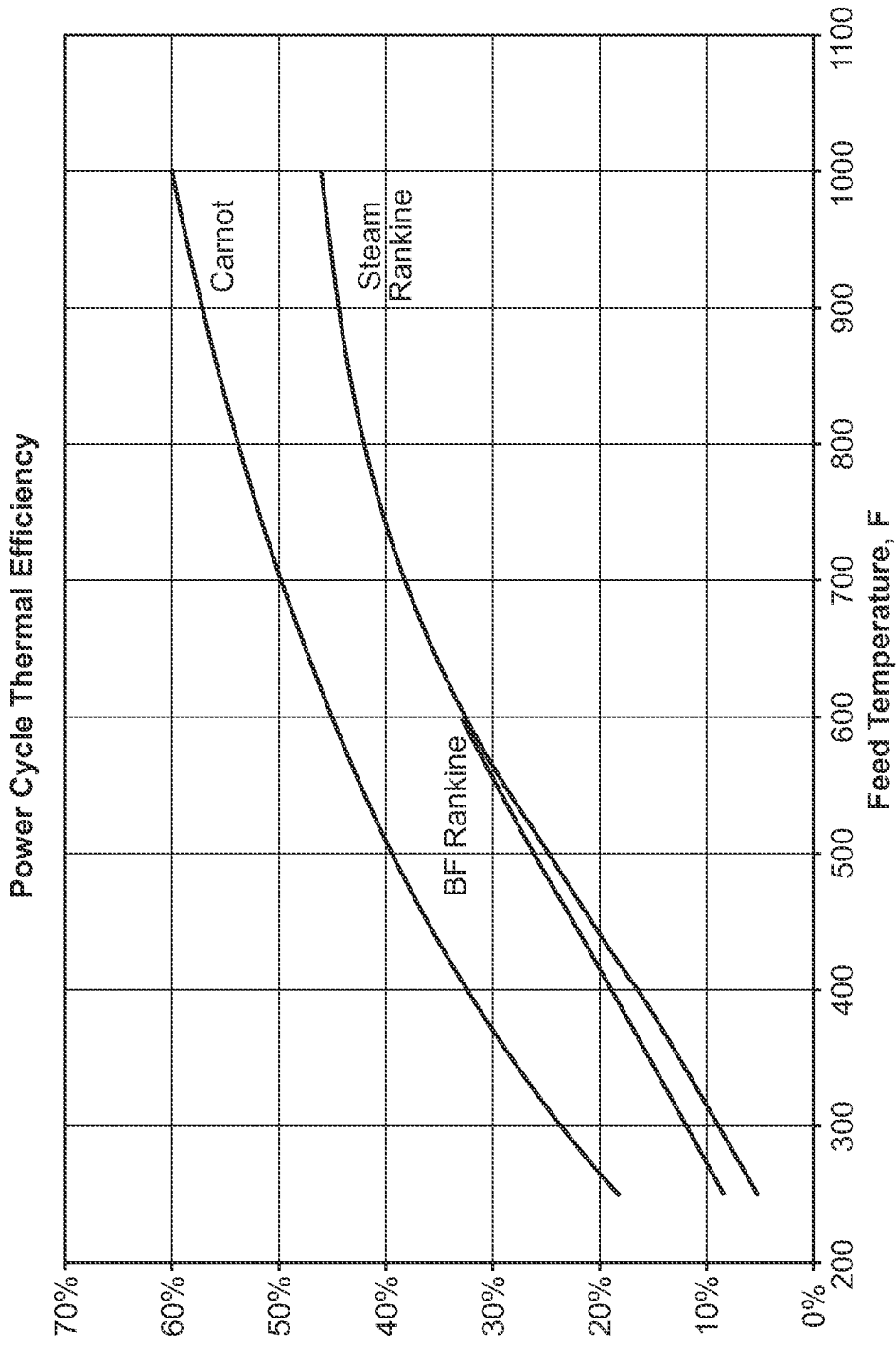
FIG. 2 is an illustrative graph depicting the theoretical Carnot efficiency as function of feed temperature, and showing the increase in the approximate achievable thermal efficiencies of a high pressure steam Rankine power cycle as a function of steam feed temperature, and a binary fluid ORC power cycle, as a function of geothermal brine feed temperature. All these cases assume a constant sink temperature.

The geosolar electric power generation methods described herein, including the system depicted in FIG. 1, can be designed for optimized power generation (including efficiencies), optimized availability and pattern of electricity generation, avoidance (or minimization) of energy loss as a result of thermal storage, and increased recovery of geothermal energy as electric power. FIG. 2 helps to illustrate the correlation between thermal energy (and temperature) and power-generating capacity, and emphasizes the advantages of minimizing thermal energy loss in an electric power generation project. FIG. 2 shows the approximate thermal efficiencies of several types of Rankine cycle power plants, as a function of temperature, and using ambient air as a heat sink. The thermal efficiency is the percentage of heat energy that is converted to electrical energy in a power plant. The top curve is the theoretical maximum that can be achieved between the source temperature and the sink temperature, using a Carnot cycle. In practice, power-generating plants cannot achieve this theoretical maximum. The lower curves are illustrative of highest efficiencies achieved by currently operating Rankine cycle power plants. Using a single component working fluid, water/steam, the efficiency is shown on the Steam Rankine curve. Using an organic binary-fluid Rankine cycle with a thermal feed of hot geothermal brine and flashed steam, the efficiency is shown on the B.F. Rankine curve. The binary fluid cycle adds an increment of 2% to 3% over the steam Rankine thermal efficiency, between temperatures of 500 and 350° F., and increases power output by 10-25%.

Naturally, the injection of high-temperature heat into a geothermal reservoir will result in a temperature drop and, thus, a loss of power generating capability. For example, the thermal efficiency is approximately 40% for a 704° F. heat source, corresponding to the critical temperature of water. If this high-temperature heat was used to heat injection fluid, and the return temperature of a produced fluid was less than 400° F., then the thermal efficiency of electricity generation from the recovered heat would likely be less than 20% (FIG. 2).

The geosolar electric power generation project depicted in FIG. 1 can be designed such that the injection fluid is heated with a relatively low-temperature (and, therefore, lower-cost) heat (i.e. with heat that is only incrementally higher in temperature than the natural geothermal brine at the exchange point). Using this design, the geosolar electric power generation project can recover the heat quickly at a temperature close to the injected fluid temperature, resulting in a lower loss in the generating capability from the stored heat. Moreover, this loss can be more than offset by simultaneously harvesting energy derived from the natural heat that is initially present in the natural geothermal reservoir. This point is illustrated in Example 1, below.

The present geosolar electric power generation projects can also be designed for around-the-clock power generation using a geothermal plant, regardless of weather conditions. To enhance the efficiency of the electric power generation process, the method can be used to capture excess energy (that is, energy not immediately utilized for electric power generation) from the thermal power plant during peak production times (e.g., in the case of a solar power plant—during peak solar insolation periods). Excess daily heat (in excess of that needed to fully occupy the power block in "real time") can be readily stored, and the amount of heat stored can be adjusted easily throughout the day by varying the brine injection rate and controlling steam bleeds from the solar thermal power plant. Indeed, by drawing upon resources that offer different patterns and degrees of "demand-ability" and flexibility, and by having the ability to use one resource to enhance the accessibility of the other, as well as the ability to store the product of one resource within the other, and by virtue of a combination of these factors, geosolar electric generation facilities optimized according to the present disclosure can be remarkably flexible.

A variety of thermally-driven power sources may be used as a heat source to directly or indirectly heat the injection fluids in the present methods. For example solar energy (collected in a field of solar collectors, for example) can be used to heat the fluid(s) to be injected into the geothermal reservoir directly. However, indirect heating using other thermally-driven power sources may also be used. These other sources include, but are not limited to, a natural gas turbine combined-cycle plant, or a power plant driven by fuels, such as fossil fuels or biomass. Solar thermal power plants are particularly well-suited for use in the present methods, providing high temperature heat and peak insolation period heat storage; and using this heat in the brine heaters makes this possible.

Various types of solar thermal electric power generation plants are available. They all collect and concentrate solar energy (energy contained in sunlight) and convert it to thermal energy (heat, in a working fluid), allowing the heat to be used to generate electric power. Current technologies include solar furnaces with temperatures exceeding 1000° C. (over 1800° F.), solar power towers that achieve temperatures in the range of 600 to 1100° C. (1100 to 2000° F.), parabolic concentrators operating in the range 300 to 550° C. (570 to 1000° F.), and Stirling engine dish-concentrator systems, which are smaller electric power generators that can be used to generate power on a utility scale when used in large numbers. (Kreith and Kreider 1978) In addition, commercial solar thermal electric power generating plants that use "Compact Linear Fresnel Reflector" (CLFR) plate concentrators, designed to generate steam at 250-285° C. (480 to 545° F.) as the working fluid, have been announced (Mills and Morrison 2006; Mills and Morgan 2007).

In some embodiments of the present methods, a solar thermal power plant that utilizes heat from several types of solar concentrators within the same geosolar electric power generation project is utilized. A key advantage of using solar energy is that the radiant heat source can be concentrated to achieve very high temperatures, so some solar concentrators are designed to reach higher temperatures than others. Normally, these concentrators cost significantly more than less-intense concentrators (Kreider 1978). Certain advantages may be associated with utilizing two or more types of concentrators in combination within a geosolar plant in a way that optimizes energy capture, cost, and the achievement of high temperatures. As an example, feed water that has been preheated in a typical regenerative heater train (see Babcock and Wilcox 1975) can be routed to solar concentrators that act as steam boilers. The resulting relatively-high-pressure steam can be superheated using a heat-transfer fluid (HTF; also commonly called "hot oil") from a second set of higher-temperature solar concentrators. The addition of a hot oil system also facilitates the inclusion of hot-oil heat storage systems. The use of superheating and reheating can increase the power plant thermal efficiency as well as reduce turbine problems that might otherwise result from condensation in the turbine stages. The overall result of utilizing superheated turbine inlet steam, and then bleeding interstage hot fluids to brine heaters, followed by reheating of the remaining steam, can provide a significant increase in the solar thermal power plant efficiency.

In other embodiments of the present methods, the geosolar electric power generation project can utilize a conventional thermal power plant (or thermal energy from such plant) in conjunction with solar heat. For example, heat from higher-temperature solar collectors or higher-temperature heat recovered from a conventional power plant can be used to superheat solar-generated steam prior to its introduction into a high-pressure steam turbine, and to reheat interstage steam prior to its introduction into a low-pressure steam turbine. In addition, heat generated from conventionally fired heaters or recovered by heat recovery units could be used to superheat or reheat working fluids in a geothermal plant used within a geosolar electric power generation plant. In addition, high-temperature solar heat stored in surface thermal energy storage (TES), such as hot oil/rock systems, solid media (such as concrete) storage systems, or molten-salt storage systems, could also be used to superheat or reheat working fluids in a geothermal plant, substantially increasing the thermal efficiency of the plant.

Additional embodiments of the present methods use thermal energy storage (TES) to improve the flexibility and operability as well as capture peak period electricity pricing. TES can store high temperature heat and use this heat to feed either the thermal power plant or the geothermal power plant. Once the temperature of the TES drops to intermediate temperatures, the reserve of heat in TES can be used to heat the injection fluids in the present methods. Alternatively TES can be cycled in the intermediate temperature range to store either intermediate temperature (solar) heat or heat extracted from the thermal power plant which is later used to heat injection fluids. Utilizing TES allows operation of the heated fluid injection systems, such as (brine) heaters and injection pumps around the clock and reduces the size of the injection systems required for a given daily heat duty. The injection fluids can be heated by exchange with the TES medium or alternatively, injection fluids could be heated by a heat transfer fluid that recovers heat from TES. In another embodiment, heat recovered from TES is used to power the thermal power plant with power plant working fluids used to heat the injection fluids.

Yet other embodiments of the present methods, the geosolar electric power generation project can utilize other conventional heat sources, such as natural gas turbines, in conjunction with solar heat. For example, natural gas turbines can be used to generate power and/or generate steam in a combined-cycle plant (commonly called NGCC) as part of an integrated geosolar electric power generation project. In this embodiment, steam from an NGCC plant can be used in conjunction with solar-generated steam, or solar-generated steam can be superheated in the NGCC. Heat recovered from the turbine exhaust of an NGCC plant could be used to superheat or reheat working fluids in geosolar electric power generation plant.

Figure 5:
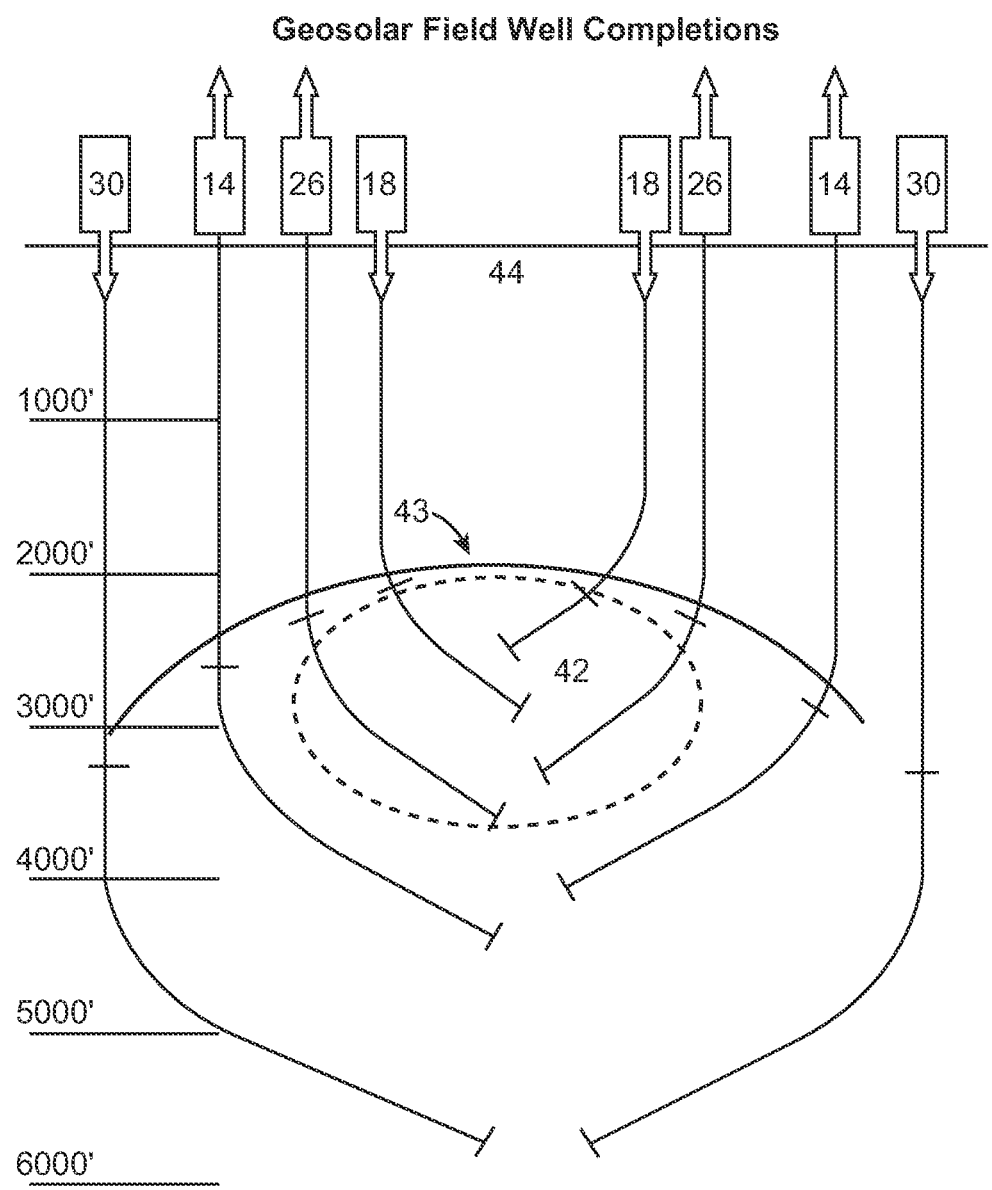
FIG. 5 is a schematic drawing showing a vertical cross section of the ground, and showing the well completion intervals for various injection and production wells, for an embodiment of the present methods and systems.

FIG. 5 is a schematic drawing illustrating one possible layout for the hot injection wells 18, hot production wells 26, fresh brine production wells 14, and spent brine injection wells 30 in a geosolar field for a geosolar electric power generation project. (For the purposes of this disclosure, geothermal reservoirs designed for use in the present geosolar electric power generation projects can be referred to as geosolar geothermal reservoirs.) FIG. 5 shows both the locations and completion intervals for the wells. The completion intervals are indicated by the hash-marks on each well-string. The well depths shown are typical, but are only an approximation of possible well depths. A variety of factors can effect the specific well locations, bottom-hole depths and locations, completion intervals, casing and tubing string designs, isolating packers, and other drilling and well completion methods that could be used in the geosolar geothermal reservoir. These factors include, but are not limited to, rock formation characteristics, natural fractures and faults, the structure of the isotherms in the hydrothermal zone, reservoir pressure, desired wellhead pressure, and injection flow rates.

In the geosolar field of FIG. 5, hot injection and production wells are desirably developed in a way that facilitates close communication of heated reservoir fluids among these wells. This allows for the recovery of heat in a timely fashion by providing for the injection of heated fluids and the subsequent recovery of heated geothermal brine with a quick turnaround time.

In order to achieve fluid communication between hot injection and hot production wells, these wells can be located in close proximity. In addition, the interim rock formation separating the injection and production wells can be fractured to encourage communication between wells. Notably, in the oil industry, the conventional goal is to prevent or minimize the rapid flow of fluids from injection wells to production wells due to fluid flow along fractures or through high-permeability zones. In stark contrast, in the present geosolar geothermal reservoirs, the interim rock formation can be viewed as a fluid conduit, with fluid flowing in the fractures, but desirably not penetrating far into the rock matrix. Thus, hot injection wells 18 can be drilled and completed with production wells 26 in relatively close proximity, although perhaps with deeper completion intervals. In this design, after a relatively short time (e.g., from about 2 to about 24 months) the heated fluids in the reservoir break through to the production wells 26, thereby rendering the production wells 26 available as hot production wells.

In FIG. 5, the hot zone created by the heated injection fluid (i.e., the zone in which the enthalpy of the natural reservoir fluids is increased due to heated fluid injection) is shown as the area 42 enclosed with a dashed line. The top of the hot zone may be contained by cap rocks 43 that isolate the hydrothermal resource. As depicted in FIG. 5, the hot zone 42 eventually encompasses the completion intervals for both the hot injection wells 18 and the hot production wells 26.

Various features of the geothermal reservoir may facilitate rapid breakthrough of the heated fluids to the production wells. These include both naturally-occurring and engineered features. Thus, development plans for the injection and production wells can take advantage of these features. For example, a geosolar geothermal reservoir well development plan can include adjustments for reservoir structure and faulting. For example, in many reservoirs, faults often cut through the reservoir, forming relatively isolated fault blocks, across which reservoir fluids do not easily migrate. In a geosolar field, these fault blocks can be used advantageously. Paired sets of hot injection/hot production wells can be drilled and completed in a single block, leading to an isolated "fault block hot zone," where it is possible to get heat breakthrough in a relatively short time (e.g., between 2 to 24 months). This rapid breakthrough would permit a geosolar field operator to raise injection fluid temperatures for the hot injectors in the fault block, and form a much higher temperature storage zone, if desired.

Permeability streaks and fracture zones can also be used to facilitate fluid communication between hot injection wells and hot production wells. For example, there may be zones in the geothermal structure forming the reservoir that have higher permeability than the bulk of the structure. Alternatively, there could be zones in the rock structure that are moderately to heavily fractured. These fractured zones are useful in a geosolar project that uses paired sets of hot injection wells and hot production wells within a single fracture zone. In one embodiment, the hot production wells are designed, drilled, and completed in close proximity to the hot injection wells, then the interim rock structure is artificially fractured to establish communication between the injection wells and the production wells. This design facilitates rapid fluid migration from injectors to producers in order to reduce heat transfer with the rock formation in the hot zone and to decrease the heat breakthrough time. The utilization of fractures allows much of the fluid to move past the bulk of the rock matrix, resulting in less fluid penetration into the matrix of pores. Such bypass can be effectively accomplished in the relatively impermeable non-porous igneous rock usually found in geothermal reservoirs.

Again, the present geosolar geothermal reservoir design differs from those adopted in conventional geothermal development plans, where spent brine injection wells inject cool spent brine into the rock formation at high rates. In such designs, injection wells are typically drilled and completed far away from production wells in order to prevent quick breakthrough of the cool fluid. There is some previous work (Bronicki 2008) using a method wherein horizontal wells are completed in close proximity (e.g., within several thousand feet) and wherein communication between wells is encouraged. However, the Bronicki process extracts heat from a formation by injecting cold reservoir fluid and producing hotter fluid heated by the geothermal reservoir formation in a process called "heat mining." As such, the Bronicki process is very different from the present geosolar electric power generation methods, as illustrated in FIG. 5, wherein injection fluids having a temperature above that of the reservoir are added to the reservoir through wells 18, and heated fluids are produced from wells 26 in close proximity.

The injection wells and fractured zones in a geosolar geothermal reservoir can be produced using known methods. For example, the hot injection wells can be drilled using directional and horizontal drilling techniques, and the rock formations can be artificially fractured using industry available fracturing techniques. The fractured wells may be acid treated and/or propants may be injected, in order to maintain open fractures. Additionally, a variety of known drilling and well completion techniques can be used to increase achievable injection rates and encourage communication between paired sets of injection/production wells.

The present methods also allow for the recovery of injected heat prior to the breakthrough of heated fluids into the production wells. For example, at times when maximal electricity generation is desired, one or more of the hot injection wells can be switched to production mode, thereby converting the hot injection wells into hot production wells. This conversion allows fluids to be recovered before the injected fluid cools substantially and further allows the recently heated geothermal fluids to be produced and used in a geothermal power plant prior to (or even after) breakthrough has occurred. Not all hot injection wells need be converted. Some hot injection wells can continue to inject heated injection fluids into the geothermal reservoir during time periods when excess heat is available. Eventually, breakthrough will occur to the closest production wells, creating hot production wells which can be used as a source of heat for a geothermal power plant, as illustrated in FIG. 1.

When injection wells are switched over to production wells, the switch desirably occurs prior to the fluid reaching thermal equilibrium. Typically, this reversal can occur within several weeks of the commencement of the injection of the heated injection fluid. After several injection/production cycles over a timeframe of, for example, 2 to 6 months, the bottom-hole temperature of the produced fluid during the recovery mode can be, for example, within 50° F. of the injected brine temperature. After multiple injection/production cycles, the bottom-hole temperature will be determined primarily by the mixing of the heated injection fluids with the geothermal brine, and not by heat loss to the rock formation.

The geosolar field shown in FIG. 5 also includes fresh brine production wells 14. These fresh brine production wells 14 are located outside the hot zone and are configured to produce fresh reservoir brine from a fresh brine production zone that is outside and below the hot zone.

After recovering the heat from and, therefore, cooling the produced heated geothermal brine in a geothermal power plant, the resulting spent brine is injected through spent brine injection wells 30. These spent brine injection wells can be closer to the production zone than in a typical geothermal field, where the flank injection wells are often several miles away from the production zone. In the present geosolar methods, the cooler spent brine can be injected at a closer proximity, since concerns about degrading the temperature of the hot zone are mitigated by the ability to inject heat.

The spent brine injection well bottom-hole locations are desirably chosen to help maintain the pressure of the hot zone in the geothermal reservoir by positioning the spent brine injection wells 30 in the reservoir such that the injected spent brine immediately contributes to maintaining reservoir pressure, but takes a reasonable amount of time to migrate back to the fresh brine production wells 14. During this migration time, natural geothermal heat can raise the temperature of the spent brine back to a temperature close to the original geothermal reservoir temperature. Thus, in determining the optimal migration time the advantages of allowing the injected spent brine to absorbs enough heat to raise the temperature almost to the original reservoir temperature level before entering the production zone should be considered. In some embodiments, the preferred migration time from the spent brine injection wells back to the production zone would be from about 2 years to about 10 years.

Maintaining the pressure of the hot zone is desirable since geothermal fields can experience rapid pressure drops if too much fluid is withdrawn from the reservoir. Although in a geosolar field, heated fluids can be injected into the hot zone, in relatively close proximity the producers, there can still be a net drawdown, to the extent that reservoir fluids mix with the injected fluids, and more fluid volume is withdrawn from the hot zone area than the volume injected. In this situation, the spent brine flank injection wells can be designed such that eventually the spent brine from these flank injectors can migrate back to the fresh brine producers or the hot zone and replenish the excess volume withdrawn.

Another cause of pressure drops in geothermal fields is the thermal contraction of the fluids in the reservoir as heat is withdrawn and the average temperature of the reservoir fluids declines. In a geosolar geothermal reservoir, the increased heat in the hot zone can raise the average temperature for a time, but then as spent brine begins to migrate back toward the hot zone area, the average temperature can drop. In addition, some of the circulated brine and flash steam can be lost from the brine plant and the geothermal power plant, in spite of efforts to minimize this loss. Eventually supplemental water or brine injection may be desirable in order to keep the reservoir pressure from dropping to undesirable levels.

It should be noted that, although FIG. 5 shows hot injection wells 18 completed in a shallower zone than the closest production wells 26, resulting in a shallow hot zone under the cap rock, other configurations for the hot zone, and other configurations of the wells are possible. For example, if the geothermal reservoir has a very high temperature, there could be an advantage to injecting hot brine in a deeper zone, and producing hot fluids from a shallower zone. Another option, would be to move the spent brine injection well 30 completion intervals further away, and into a shallower zone. The source and direction of the hydrothermal brine flows can have a major impact on the hot zone location, and the entire well development plan. Although FIG. 5 shows an example of a well development and completion strategy, there are others that could be utilized depending on specific reservoir parameters.

Figure 3:
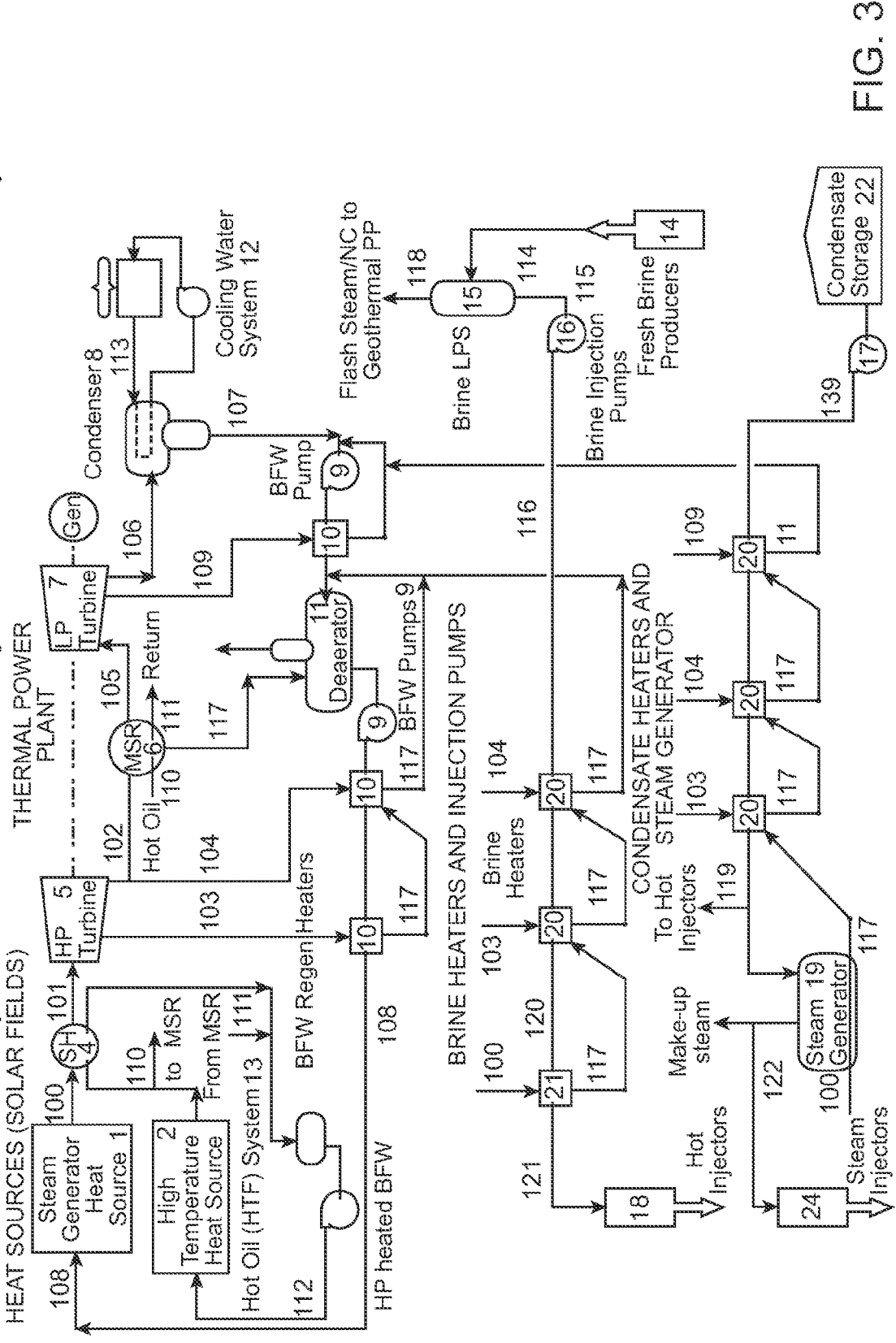
FIG. 3 is a block flow schematic diagram showing the heat sources, and the main process steps in the thermal power plant, brine heaters, and injection wells utilized in an embodiment of the present methods.

In order to understand many of the alternative process options and alternatives encompassed or envisioned by the methods, systems and projects described herein, a more detailed look at a portion of a geosolar electric power generation project flow diagram is provided in FIG. 3. Specifically, FIG. 3 shows an illustrative schematic flow diagram of a geosolar electric power generation project "front end," including the heat sources, thermal power plant, brine heaters and hot injection wells. FIG. 3 also shows an illustrative schematic flow diagram for a heat exchanger train leading to steam generation and injection.

At the top of FIG. 3, the steam-generator heat source 1 that generates steam (or vaporizes other working fluids) could be, for example, solar concentrators, fired fuel steam generators and associate waste-heat recovery unit (HRU), or a heat recovery unit on a natural gas turbine combined cycle system (NGCC). The solar concentrators used as steam generators could be Compact Linear Fresnel Reflectors (CLFRs), Parabolic Trough Collectors (PTCs), or other concentrators that can boil steam at pressures over 1000 PSI (Stoddard et al., NREL 2006). Again, for simplicity, steam will be discussed as the working fluid, although other power-cycle fluids could be utilized in the thermal power plant. The high-temperature heat source 2 could be solar concentrators such as PTCs or power towers, or fired fuel steam generators, or the heat recovery unit on an NGCC. The saturated steam 100 from the steam generators is sent through a superheater 4 utilizing the high-temperature heat source to provide superheated steam 101 to a high-pressure steam turbine-generator set 5. Alternatively, the saturated steam 100 could be fed to the steam turbine 5 directly, although these two alternatives would require a different design for the steam turbine. There are various interstage steam bleeds 103 and 104 at pressures different from that in the high-pressure turbine, that are used in the boiler feed water (BFW) regeneration heaters 10, or brine heaters 20. The steam 102 exiting the turbine is sent to a moisture removal and re-heater 6 often called an MSR, where condensed steam 117 is removed and the low pressure steam 102 is reheated to provide a superheated steam feed 105 to the LP Turbine.

In the embodiment of the system shown in FIG. 3, the reheated steam 105 drives the low-pressure turbine-generator set 7. (In other variants, the LP steam 102 could be used to heat and vaporize a power-cycle fluid.) In the LP turbine 7 interstage steam bleeds 109 could be removed from the low-pressure turbine for use in BFW heaters 10. The exhaust steam 106 from the low-pressure turbine is cooled in the condenser 8 and the condensate 107 is pumped 9, reheated 10, de-aerated 11, and the heated, high pressure boiler feed water (BFW) 108 is returned to the steam boiler 1. The steam bleeds 103, 104, and 109 condense in the BFW heaters 10 and the steam condensates 117 are trapped and routed to a lower-pressure BFW heater 10. Eventually the steam condensate streams 117 end up in the BFW. The combination of high-pressure (HP) and low-pressure (LP) turbines in FIG. 3 is illustrative of one common design, but many other designs can be utilized. For example, an intermediate-pressure (IP) turbine can be inserted to allow for external moisture removal and additional reheating.

As shown in FIGS. 1 and 3, interstage steam bleeds 103 and 104 can be used in the brine heaters 20. This makes it possible for the present geosolar electricity generation projects to remove 10% to 70% of the thermal power plant heat, depending on design. It should be understood that the thermal power plant represented in the accompanying figures is a simplified representation and is not intended to provide an exhaustive description of a thermal power plant, nor is it intended to depict every design alternative. Many different power plant designs are currently known and/or available for use in the present systems. Depending upon the nature of these power plants, they may be used in their conventional manner, or they may be modified in order to capitalize on the improved efficiencies provided by the present methods and projects. For example, a thermal power plant could use interstage bleeds 103 and 104 to reheat and regenerate BFW. This option may be used, for example, with solar-generated-steam-driven power plants. If this design is employed, the arrangement of the regenerative heaters 10, and the use of other heat streams in additional BFW heaters, could be designed as appropriate based on project-specific heat balances. Also, the locations of the de-aerator 11, BFW heaters 10, and BFW pumps 9 can vary from the sequence shown in FIG. 1. Different configurations for the design and operation of this heat-exchanger train, as a result of using additional bleed steam in the brine heaters 20, are also possible.

Reservoir fluids 114, which include reservoir brine along with flashed steam and non-condensable (NC) gases, are produced from production wells 14 drilled into a zone in the geothermal field where there is a source of a significant volume of geothermal brine. The reservoir fluids 114 are separated in a production separator 15, and the flashed steam and NC gases 118 are sent to the geothermal power plant. The brine 115 is pumped 16 to injection pressure and the pressurized brine 116 is heated in the brine heaters 20 which utilize steam bleeds 103 and 104 from the thermal power plant. The final brine heater 21 is optional and could use steam 100 directly from the solar field 1 to heat the brine 120 to the final desired injection temperature. The steam condensate 117 flows through steam traps from each brine heater 20 and 21 and is sent to a lower-pressure-and-temperature brine heater 20. The steam condensate 117 from the last brine heater is sent back to the thermal power plant and mixed into the BFW 107. Thus, all the working fluid from the thermal power plant is returned. After countercurrent heating, the heated pressurized brine 121 is injected into a selected geothermal hot zone using the hot injection wells 18. In the brine heaters, one design variation includes sending one or more of the steam condensate flows labeled 117 from the brine heaters 20 and 21, back to a lower pressure BFW heater 10, instead of a lower pressure brine heater 20.

After injection, the heated fluids penetrate primarily into fractures in the rock formation. At some point, the hot injection wells 18 can be reversed, and heated geothermal reservoir fluids can be produced. The reversal of a hot injection well can occur, for example, within one to thirty days of commencing injection into that particular hot injection well 18. In addition, some hot injection wells 18 may have had excess hot fluids injected long enough that the heat front has broken through to the closest production wells. These hot production wells 26 can then be used to recover hot fluids from the geothermal reservoir.

Figure 4:
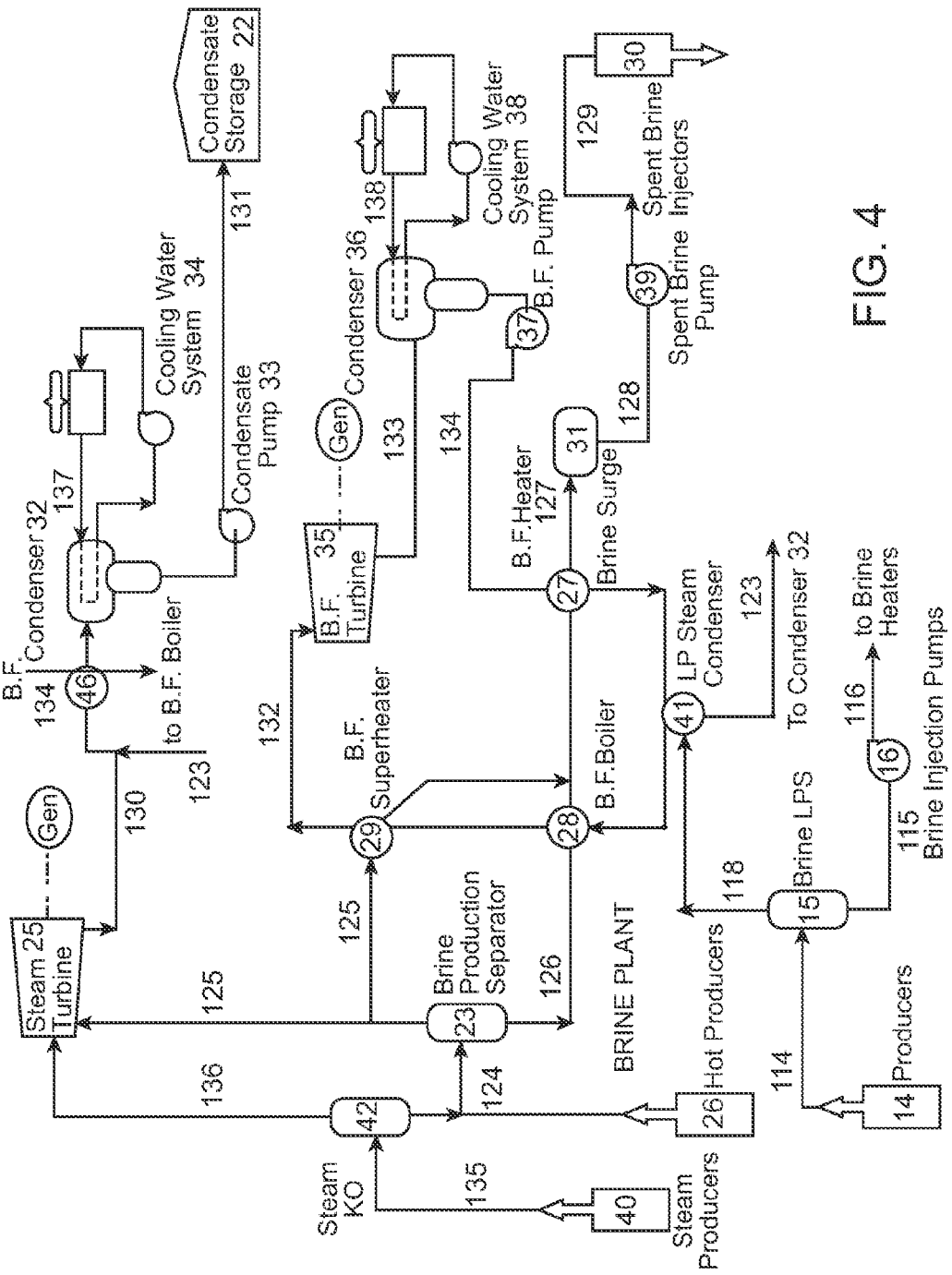
FIG. 4 is a block flow schematic diagram showing the hot reservoir fluid production wells, the main process steps in the brine production and separation plant and the geothermal power plant utilized in an embodiment of the present methods.

FIG. 4 shows the "back-end" of a geosolar electrical generation project. In FIG. 4, the hot production wells 26 supply produced fluids 124 to the brine production separator 23, where the flashed steam 125 is separated from the produced heated brine 126. In one geothermal power plant configuration, both the flash steam 125 and produced heated brine 126 are used counter-currently to heat and then vaporize a working fluid 134 in an organic Rankine cycle (ORC) power plant in exchangers 27, 28, and 29. Typically an ORC working fluid is known as binary fluid (B.F.), since it is most often a mixture of two organic liquids, hence exchanger 27 is called a B.F. Heater, exchanger 28 is called a B.F. Boiler, and exchanger 29 is called a B.F. Superheater. In this example, geothermal fluids that are not heated significantly above the original reservoir temperature can be produced by production wells 14 and delivered into the brine low-pressure separator 15. The brine 115 is sent to the brine heaters, and the flashed steam 118 is used to heat the B.F. in exchanger 41. In the ORC, superheated B.F. vapor 129 is fed to a turbine-generator power block 35. The geothermal turbine exhaust 130 is condensed in a condenser 26, cooled by a cooling system 27, then the condensed working fluid is pumped 28 back to the working fluid heaters 21 and 22 and the working fluid vaporizer 23. Meanwhile the spent reservoir brine 127 can be accumulated in a surge vessel 31, then pumped by spent brine pumps 39 to spent brine injection wells 30.

A second, non-limiting variation of the geothermal power plant uses a compound combined cycle. In this variant, flash steam 125 from the brine production separator 23 is sent to a steam turbine 25. Steam 136 from steam production wells 40 could also be fed to steam turbine 25. The steam turbine exhaust 131 is condensed 32 and the condensate 131 is sent to condensate storage tankage 22. Flashed geothermal steam 118 from lower-pressure separators 15 is condensed 41, and the condensate 123 is mixed into the condensate storage tank as well.

Although heated geothermal brine exemplifies one injection fluid, other fluids may be used. In the geothermal power plant of FIG. 4, flashed steam 125 can be condensed to form a condensate water 131 with a relatively low salinity. This condensate water can be reheated and combined with fresh brine 115 (FIG. 3) for injection into the hot zone. Optionally, the condensate water can be combined with the spent brine 128 (FIG. 4) and injected into the spent brine injectors. Alternatively the condensate can be pumped 17 (FIG. 3) to injection pressure and sent to a heat exchanger train culminating in a steam generator 19, boiled to form high pressure steam 122, and injected into a steam hot zone by steam injectors 24.

In the present geosolar electricity generation projects heated brine, heated condensate water, high pressure steam, or a combination of these fluids, can be injected into the hot zone of the geosolar geothermal reservoir. There are cases, when alternating injections of steam, heated brine, and/or pressurized hot water into the hot injectors is desirable. For example, initially heated brine could be injected, followed by higher temperature pressurized water, and finally by high pressure steam. When a hot injection well is reversed to produce the heated fluids, the produced fluids from this well will have a higher proportion of high enthalpy steam, and could be produced into a higher pressure brine separator, thus providing a higher temperature feed to the geothermal power plant.

Figure 6:
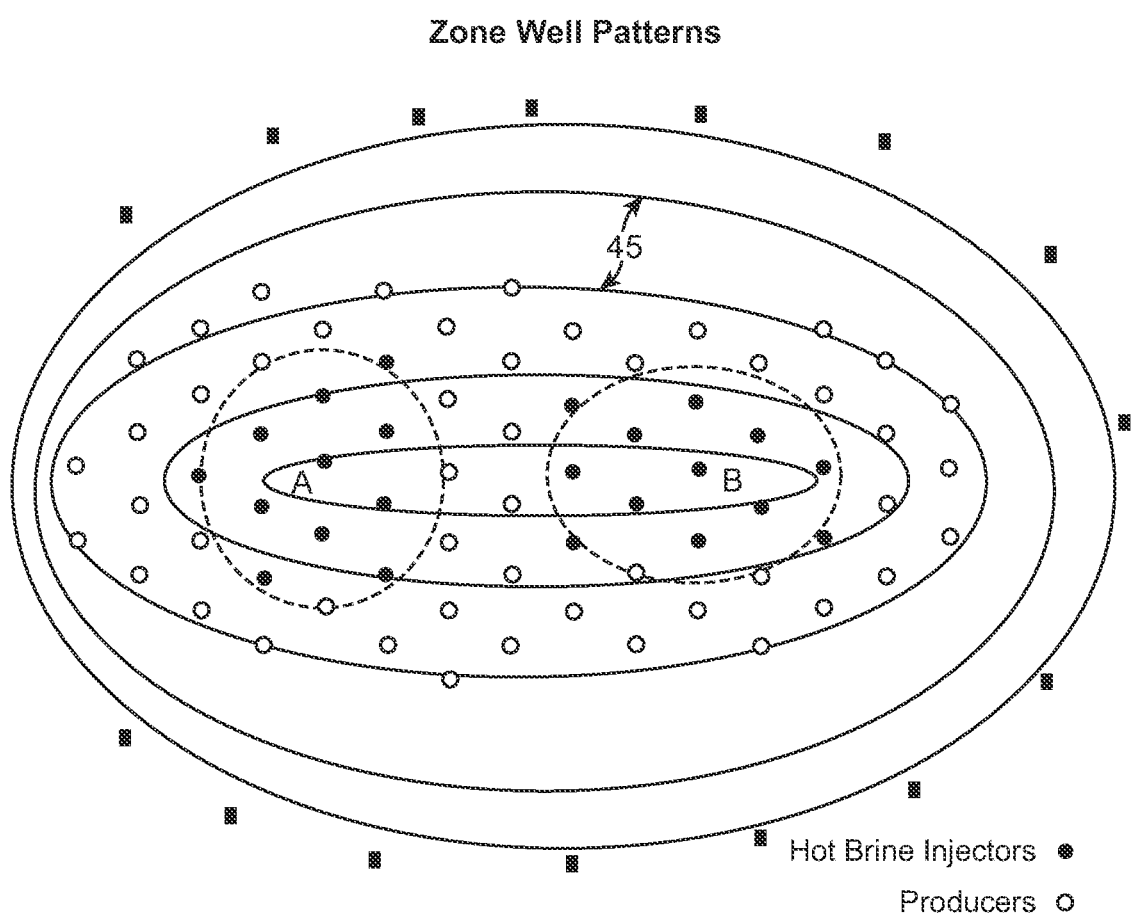
FIG. 6 is a schematic overview drawing depicting an example of one pattern of wells and illustrating a staged zone project that could be used in an embodiment of the present methods.

FIG. 6 shows an illustrative schematic plan view of the wells, isotherms, and hot zones A and B, in one embodiment of geosolar geothermal field. The oval shaped isotherm lines 45 are shown to illustrate lines of constant temperature at a depth that includes the completion intervals of the wells. The center isotherms are the hottest. For purposes of illustration only, the temperatures of the isotherms in FIG. 6 are 380 and 360° F., with the largest oval showing the extent of the geothermal zone that is within 300° F. The solid shaded circles represent the hot injection wells and the hollow circles represent the production wells. The spent brine injection wells are located in the somewhat cooler flanks of the reservoir. In this example the reservoir temperature is less than 300° F. where the spent brine injection wells are located.

In practice, all of the wells can be deviated and slant drilled, with completion intervals slanted due to the deviated well bores. For simplicity, these completion intervals are shown by the circles and squares in FIG. 6. Furthermore, the completion interval used for injection or production may encounter different temperatures at different depths in the original reservoir, before the wells are used for either injection or production.

In the embodiment illustrated in FIG. 6, after heated fluids are injected into the hottest naturally existing zone of the geothermal reservoir, multiple (e.g., at least two) hot zones (shown as A and B in FIG. 6) are created. Initially most of the heated fluid injection may be directed to hot zone A, thereby raising the temperature in the hot zone enclosed by the dashed line to over 400° F. In some embodiments, the injection and production wells are designed such that the heated fluids will break through to the nearest production wells (the hollow circles shown on the edges of the dashed line area A on the diagram) within 24 months. The production wells where heated fluids have broken through can be segregated as hot production wells, and provide a geothermal fluid feed (FIG. 1 stream 124) to the brine plant and the geothermal power plant. At this point, zone A hot injectors could begin injecting even hotter fluids, such as hotter brine, pressurized water, or even higher temperature steam, thus raising the temperature of zone A even higher.

Eventually, it might be desired to switch heated fluid injection to zone B and to convert the hot injection wells in zone A to hot production wells. Using this approach zone A can be operated partially, or entirely as a heat mining production zone, and can feed the geothermal power plant, while zone B can receive the entire volume of the heated injection fluid. This staged zone development, provides an advantageous geosolar geothermal reservoir production plan for certain types of geothermal fields. Eventually, (e.g., after several years), zone A can be converted back into a hot fluid injection zone, and zone B can be switched to a heat mining operation.

Many different geothermal power plant configurations are compatible with the geosolar electric power generation projects described herein. For example, a binary-fluid power plant could be used, such as a two-flash binary plant. In other applications, a compound combined cycle using a geothermal flash steam Rankine cycle coupled with a binary-fluid cycle can be used. The size and scope of a geosolar electric power generation project is also well-suited for use with a Kalina cycle, which utilizes a working fluid of water and ammonia. It has been reported that a Kalina cycle can extract an additional 10 percent of energy for the same feed temperature and sink temperature compared to two-flash binary systems (KALEX Systems Brochure 2008).

Figure 7:
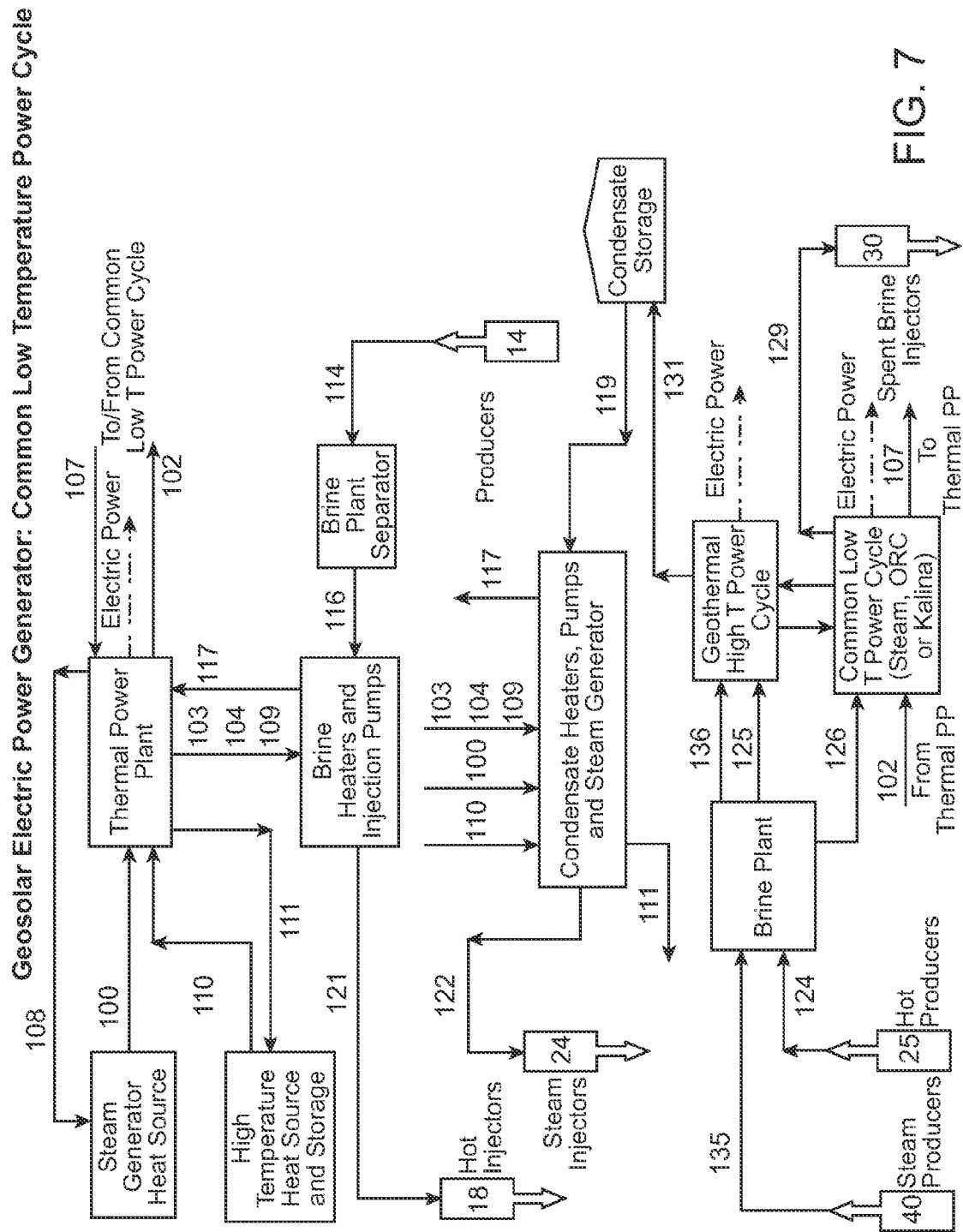
FIG. 7 is a block flow schematic diagram showing several alternative embodiments of the present systems, that integrate some common elements comprising the two power plants in a geosolar electric power generation project.

If a steam Rankine cycle is used in the thermal power plant, and a steam Rankine cycle is used in a combined-cycle geothermal plant, the steam flows can be commingled and a common power-generating turbine can be utilized. FIG. 7 is a schematic block flow diagram that shows how a solar thermal power plant can be integrated with the geothermal power plant. In the process depicted in FIG. 7, flashed steam from the geothermal plant is commingled with the HP steam-turbine exhaust from the (solar) thermal power plant and sent to a common LP steam turbine-generator power block.

In the same vein, if an ORC or Kalina cycle is utilized for both the LP turbine in the thermal power plant and similarly in the geothermal power plant, these power plant sections can be combined and utilize a common turbine-generator power block. FIG. 7 shows a schematic block flow diagram of one such process scheme.

Notably, the present geosolar electric power generation projects can operate synergistically with other thermal power plants or projects, that either produce heat, or offer a heat sink, when they are co-located with said other plants or projects. For example, an integrated low temperature power cycle, such as an ORC or Kalina cycle used in the geothermal power plant, could use heat from process plants that produce waste heat. Some types of process plants that utilize heat and produce low temperature waste heat include, but are not limited to, cement manufacturing plants, chemical plants, and refinery units, as well as conventional fuel fired power plants. An example of a project that offers a heat sink, is an LNG terminal, where a very low temperature heat sink exists. The present geosolar electric power generation projects can be co-located at sites where these types of facilities are planned, or currently exist.

The present geosolar electric power generation projects also provide an excellent opportunity to develop deep zone hot dry rock (HDR) geothermal projects, or engineered geothermal systems (EGS) projects. These projects involve drilling injection/production-paired wells into very deep dry-rock zones where the formation is very impermeable, fracturing rock between the wells, and trying to establish communication between wells. The well costs for these kinds of projects are much higher than shallower projects due to the depth and hard rock formations encountered. However, HDR and EGS projects use surface facilities that can be included in the present geosolar electric power generation projects, such as the brine plant, brine injection system, and geothermal power plant. They can also use common infrastructure, such as electrical power transmission lines and switchgear, control systems, and maintenance and support systems. Therefore, developing HDR and EGS projects in deeper zones under a geosolar geothermal reservoir field, has the potential to reduce the necessary investment relative to a standalone project.

The invention will be further described by reference to the following example which is presented for the purpose of illustration only and is not intended to limit the scope of the invention.

EXAMPLE 1

As described in detail above, in the present geosolar electric power generation projects, heated reservoir fluid produced from the hot zone in a geothermal reservoir is used in a geothermal power plant (e.g., FIG. 1), where the fluid exchanges heat with the working fluid of a power cycle. The produced fluid can cooled to the lowest allowable temperature that will allow prevention of silica scaling. For the purposes of this example, this temperature is assumed to be about 160° F. A binary fluid ORC geothermal plant, exchanges heat from the binary fluid with the produced geothermal brine ("fresh brine"), and is able to extract heat down to this temperature, thereby providing extraction of heat energy originating from the geothermal reservoir. The following example illustrates this process through calculations of the heat energy added to the reservoir fluids, the amount of energy recovered, and the resulting electrical power generated.

In this example, the geosolar electric power generation project is illustrated by a site that includes a geothermal reservoir containing brine at 350° F. (For purposes of this example, thermodynamic properties of water are used for the brine, and the enthalpy units are expressed in BTU per pound, measured relative to the reference enthalpy of liquid water at 32° F.) (Moran and Shapiro 1992.) If fresh reservoir brine is produced into a separator at 50 PSIA, the temperature would be the saturation temperature of water at that pressure, i.e., 280° F. In the fresh brine production separator, about 7.8% of the brine mass flow would flash to steam. The flashed steam can be used as a heat source in a binary fluid geothermal power plant. The thermal efficiency of a Binary Fluid Rankine cycle utilizing steam at 280° F. can be estimated from FIG. 2 at 10.5% when a heat-sink temperature of 120° F. is used. When the flash steam is used in the binary fluid plant, and cooled to 120° F., the change in enthalpy is from 1173.8 to 88, or 1085.8 BTU per pound. Multiplying this heat by the thermal efficiency and converting from BTU per pound to watts per pound per hour gives 2.61 MW per million pounds per hour of fresh reservoir fluids (brine+flash steam) produced. Adjusting the basis gives 2.83 MW for every million pounds per hour of fresh brine produced from the separator.

The fresh brine is pumped to above 500 PSI, then heated in stages from 280° F. to 330° F. using a 350° F. interstage bleed steam; then to 380° F. using 400° F. steam; then to 430° F. using 450° F. steam; then injected into the reservoir. In the first heater, the amount of heat transferred is 51.7 BTU per pound of brine. If the 350° F. steam had been used in the solar thermal power plant steam Rankine cycle, this heat could have been converted at 13.2% thermal efficiency to power, and thus generate 2.00 MW, instead of heating a million pounds per hour of brine. Likewise, the second heater uses steam heat that could have generated 2.57 MW at 16.6% efficiency, and the third heater 3.22 MW at 20.2% efficiency. Thus, the total reduction in the thermal power plant generating capability that results from heating the brine directly is 7.78 MW per million pounds per hour of brine.

When the heated brine is injected into the reservoir, it will mix with the reservoir fluids there, and the mixed enthalpy will be lower than the injected brine enthalpy. The injected brine may also lose some heat to the rock formation, but after repeated injection/production cycles, this heat loss will be reduced significantly. For purposes of this example, the mix ratio is chosen to be one million pounds of injected brine at 430° F. which, when mixed with 0.5 million pounds of fresh reservoir brine at 350° F., forms a mixed brine at 403° F. The mixed enthalpy is 379 compared to the injected brine enthalpy of 408. The mixed brine is then produced and utilized to generate power in a geothermal power plant with a spent-brine outlet temperature limited to 160° F. to avoid silica fouling. The heat recovered is 251 BTU per pound (mixed-brine enthalpy of 379 minus the brine enthalpy of 128 at 160° F.). For the 1.5 million pounds per hour of mixed-brine production, there is 376.5 million BTU per hour of available heat that is converted to electric power at 16.2% thermal efficiency in the binary fluid geothermal power plant to generate 17.9 MW. The output of the geothermal plant also should include 2.61 MW from the fresh brine flash steam calculated above, for a total of 20.51 MW on a basis of a million pounds per hour of heated brine injected. Note that about 12.95 MW (63%) is from heat originally from the geothermal reservoir and 7.56 MW (37%) is from the stored heat injected.

In this example, 7.56 MW is recovered in the geothermal plant compared to a 7.78 MW reduction in solar thermal plant output when the interstage steam is removed, a loss of less than 3%. In this instance, this loss is quite low because the binary fluid geothermal power plant has roughly the same overall thermal efficiency (on the cooler mixed brine) as the steam Rankine cycle solar thermal power plant efficiency (on the warmer steam bleeds). The loss would be larger if the original reservoir fluid was cooler, fewer or hotter interstage bleed-steams are used, there was significant heat loss to the rock formation, and/or parasitic electrical loads were considered. Nevertheless, the loss of power generation capability due to injecting and recovering the heated brine, is small compared to the overall power generated from the geosolar geothermal reservoir fluids.

The net result is that, if 30 million pounds per hour of heated brine is injected into the geothermal reservoir during a solar generating period of 12 hours, and is mixed 2:1 with fresh reservoir brine, then 540 million pounds of mixed brine is available. The field would produce 22.5 million pounds per hour of mixed brine around the clock to produce all the mixed brine. The geothermal plant output would be 307 MW, with 113 MW coming from stored solar heat. The solar thermal plant in this example is designed to use one third of the available solar thermal heat to heat injected brine. With the remaining two thirds of solar heat, the solar thermal plant would generate an additional 420 MW during high-insolation daylight hours, although there could be significant seasonal variation. The geosolar project could generate 727 MW during these hours, and 307 MW at any other time, in this example.

EXAMPLE 2

Figure 8:
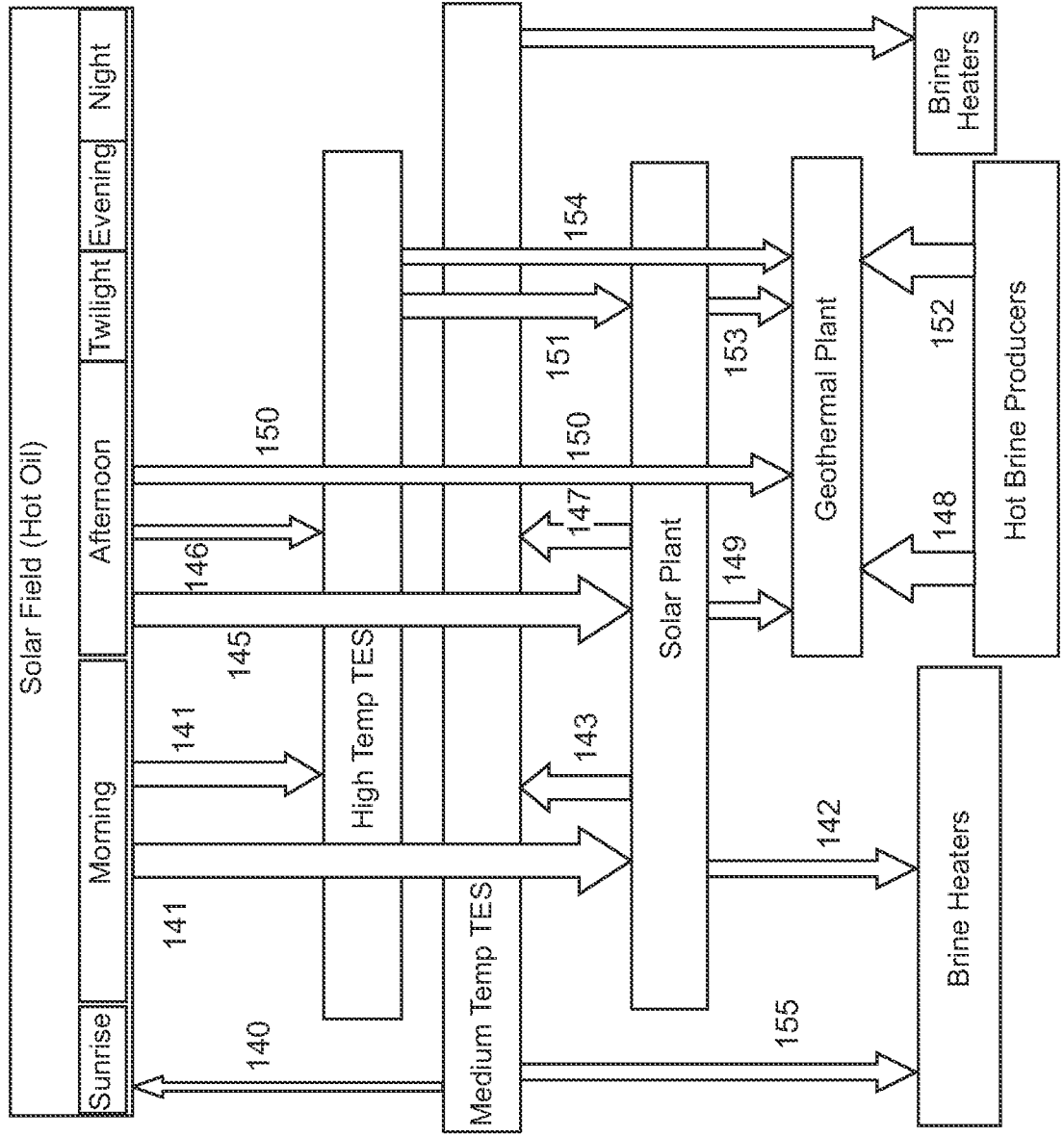
FIG. 8 is a block flow schematic drawing showing heat flows between various processes in an embodiment of the present method.

Referring to FIG. 8, the arrows on the diagram show heat flows between the different processes that typically might comprise one embodiment of the present methods, in this case a geosolar project. The solar field heat collection fluids would be warmed prior to sunrise by medium temperature heat 140 recovered from medium temperature thermal energy storage (TES). As the solar energy collection increases during the morning, high temperature heat 141 is fed to the solar power plant, with medium temperature heat 142 extracted and used in the injection fluid (brine) heaters. Additionally, medium temperature heat 143 can be used to replenish and raise the temperature of depleted TES. In a geosolar project, a significant portion of the morning high temperature solar heat 144 is likely stored in high temperature TES.

In the afternoon most high temperature solar heat 145 will be used in the solar power plant, with a smaller portion 146 sent to high temperature TES. Medium temperature heat 147 is extracted and sent to replenish medium temperature TES. In the late morning, the injection of heated brine will cease, and hot brine producers will begin producing heat 148 fed to the geothermal power plant. The feed to the geothermal plant could be augmented with medium temperature heat 149 extracted from the solar plant. Higher temperature heat 150 from the solar fields can be used to provide superheat and reheat to the geothermal plant, or otherwise used in the geothermal power cycle.

During the twilight and evening hours, the solar plant can continue operation using heat 151 recovered from high temperature TES. The geothermal plant continues operating primarily on heat from the hot producers 152 augmented by medium temperature heat 153 extracted from the solar plant. Heat 154 from high temperature TES can be used in the geothermal plant power cycle.

Once the high temperature TES heat is exhausted, the solar plant shuts down for the night. The geothermal power plant will likely turn down to a minimum baseload operation to provide power to the geosolar project, particularly the fluid (brine) injection pumps. During the night operation, heat 155 is withdrawn from the medium temperature TES and used in the brine heaters. Then the daily cycle resumes with the solar field warm-up before sunrise.

In this example, the high temperature TES system and the medium temperature TES system could share some or all subsystems. The subsystems could be operated in either temperature range and could function in either high temperature or medium temperature TES service. A depleted TES subsystem, with temperature typically less than 300 to 350° F., could be replenished by raising the temperature to a medium temperature, typically 400 to 500° F., by using heat from the thermal power plant. Such a subsystem could then either be used as in medium temperature TES service or be further replenished by raising the temperature to a higher temperature, typically in excess of 700° F., using heat from the solar collectors. The subsystem at such higher temperatures can be used in high temperature TES service, for example, as described in this example. After the temperature of a subsystem in high temperature TES service falls with use, it may subsequently be used as source of medium temperature heat in medium temperature TES service, for example, as described in this example.

This example shows the versatility and flexibility of a geosolar project, which allows continuous renewable electricity generation, storage of solar thermal heat, and peak demand period electricity generation. This embodiment also solves an operability issue with geosolar hot fluid injection. If the injection pumps and fluid (brine) heaters are sized to inject fluid only during the daylight hours, the capacity required is roughly four times the capacity required for around the clock injection. Daylight-only injection also requires a much larger number of injection wells. By utilizing TES not only for high temperature heat storage used to feed the power plants, the TES media can be used for medium temperature heat storage that allows around the clock heated fluid injection.

REFERENCES

The following is a list of the full citations for the references cited in the preceding text:
U.S. Pat. No. 4,099,381 (Rappoport 1978);
U.S. Pat. No. 4,102,133 (Anderson 1978);
U.S. Pat. No. 7,320,221 (Bronicki 2008);
U.S. Patent Application Publication No. US2006/0048770, now U.S. Pat. No. 7,472,547 (Meksvanh et al. 2006);
"Assessment of Parabolic Trough and Power Tower Solar Technology Cost and Performance Forecasts," Sargent and Lundy LLC Consulting Group, Chicago, Ill., NREL/SR-550-34440, October, 2003.
KALEX Systems, KGST Brochure, available at http://kalex-systems.com, 2008

Kreider, Jan F., "Medium and High Temperature Solar Processes," Academic Press 1979.
Kreith, Frank and Kreider, Jan F., "Principles of Solar Engineering," Hemisphere Publishing Company, 1978.
Michael J. Moran and Howard N. Shapiro, "Fundamental Engineering Thermodynamics" John Wiley and Sons, Second Edition, 1992
Mills, David R. and Morgan, Robert G., "Solar Thermal Electricity as the Primary Replacement for Coal and Oil in U.S. Generation and Transportation," Ausra, Inc., Palo Alto, Calif., 2007.
Mills, D., Le Lievre, P., and Morrison, G. L., "Lower Temperature Approach for Very Large Solar Thermal Power Plants," 2006.
NDC, "Geothermal Energy, Recent Developments," Energy Technology Review No. 32, edited by M. J. Collie, Noyes Data Corporation, Park Ridge, N.J., 1978.
"Steam/its generation and use," Babcock and Wilcox Company, 38th edition, 1975.
Stoddard, l., Abiecunas, J., O'Connell, R., "Economic, Energy, and Environmental Benefits of Concentrating Solar Power in California," Black & Veatch, Overland Park, Kans., Subcontract Report for NREL, NREL/SR-550-39291, April 2006

For the purposes of this disclosure, and unless otherwise specified, "a" or "an" means "one or more." All patents, applications, references, and publications cited herein are incorporated by reference in their entirety to the same extent as if they are individually incorporated by reference.

As will be understood by one skilled in the art, for any and all purposes, particularly in terms of providing a written description, all ranges disclosed herein also encompass any and all possible subranges and combinations of subranges thereof.

It is understood that the invention is not confined to the particular embodiments set forth herein as illustrative, but embraces all such modified forms thereof as come within the scope of the following claims.

What is claimed is:
1. A method for increasing the enthalpy of a natural geothermal brine, the method comprising:
injecting a sub-critical heated injection fluid into a naturally occurring geothermal reservoir containing a natural geothermal brine via one or more injection wells, wherein the naturally occurring geothermal reservoir has a temperature gradient higher than a normal thermal gradient of the Earth and stores natural geothermal heat within the natural geothermal brine, wherein the enthalpy of a first portion of the natural geothermal brine is increased by the heated injection fluid to create a hot zone in the geothermal reservoir with the increased enthalpy geothermal brine contained within boundaries of the hot zone;
storing the heat provided by the heated injection fluid primarily within the increased enthalpy geothermal brine in the hot zone, wherein the increased enthalpy geothermal brine stores both the heat provided by the heated injection fluid and a first portion of the natural geothermal heat;
maintaining a temperature differential between the hot zone created in the geothermal reservoir and a colder geothermal heat recovery zone of the geothermal reservoir fluidly connected with the hot zone, wherein the geothermal heat recovery zone contains a second portion of the natural geothermal brine not heated by the heated injection fluid and stores a second portion of the natural geothermal heat within the second portion of the natural geothermal brine; and containing heat provided by the heated injection fluid within the hot zone using at least one of the following methods:

interrupting or reversing an outward migration of heated fluids from the hot zone by recovering at least one of the increased enthalpy brine and the heated injection fluid from the hot zone via one or more hot zone production wells, wherein the hot zone production wells are configured to operate independently from the injection wells and are capable of producing the recovered fluid without requiring a simultaneous addition of fluid to the geothermal reservoir, periodically reversing the outward migration of the heated fluids from the hot zone by converting the injection wells into hot zone production wells and using the converted hot zone production wells to recover at least one of the increased enthalpy brine and the heated injection fluid from the hot zone, wherein the converted hot zone production wells are capable of producing the recovered fluid without requiring a simultaneous addition of fluid to the geothermal reservoir, and using one or more fresh geothermal brine production wells located outside the boundaries of the hot zone to create an inward flow of the natural geothermal brine toward the hot zone from a surrounding portion of the geothermal reservoir, and using the hot zone production wells located at a periphery of the hot zone to create an outward flow of at least one of the increased enthalpy brine and the heated injection fluid from the injection wells toward the periphery of the hot zone.

2. The method of claim 1, wherein the enthalpy of the injection fluid is higher than the enthalpy of the geothermal brine by a factor of less than 2, using the enthalpy of saturated liquid water at 0° C. as a reference standard.

3. The method of claim 1, further comprising recovering at least a portion of the geothermal brine having increased enthalpy from the hot zone of the naturally occurring geothermal reservoir.

4. The method of claim 3, wherein at least a portion of the geothermal brine having increased enthalpy is recovered before the heated injection fluid and the geothermal brine reach thermal equilibrium.

5. The method of claim 3, wherein at least a portion of the geothermal brine having increased enthalpy is recovered within 30 days of the injection of the heated injection fluid.

6. The method of claim 1, wherein the injection fluid comprises a natural geothermal brine that has been previously recovered from the naturally occurring geothermal reservoir.

7. The method of claim 1, wherein the injection fluid comprises pressurized water or steam having a temperature of no greater than 374° C.

8. The method of claim 6, further comprising alternately injecting into the geothermal reservoir the natural geothermal brine and at least one of heated pressurized water or steam.

9. The method of claim 1, wherein the geothermal reservoir comprises substantially non-porous rock.

10. The method of claim 3, further comprising using the recovered geothermal brine as a thermal feed for a geothermal power plant to produce electricity.

11. The method of claim 10, further comprising injecting spent brine from the geothermal power plant into the geothermal reservoir, wherein the spent brine is injected into the colder zone of the geothermal reservoir that is outside of, and in fluid communication with, the hot zone, such that the injected spent brine is able to migrate into the hot zone and maintain the pressure within the geothermal reservoir.

12. The method of claim 11, wherein the colder zone is configured such that the geothermal brine in the geothermal reservoir is replenished by the spent brine within 10 years.

13. The method of claim 1, wherein the heated injection fluid is heated via a transfer of heat from a heat transfer fluid.

14. The method of claim 13, wherein the heat transfer fluid is from a thermal power plant.

15. The method of claim 14, further comprising injecting spent brine from a geothermal power plant fed by natural geothermal brine into the geothermal reservoir, wherein the spent brine is injected into the colder zone of the geothermal reservoir that is outside of, and in fluid communication with, the hot zone, such that the injected spent brine is able to migrate into the hot zone and maintain the pressure within the geothermal reservoir.

16. The method of claim 14, wherein the thermal power plant is a solar thermal power plant.

17. The method of claim 1, wherein the heated injection fluid is heated via solar energy collected by solar concentrators.

18. The method of claim 1, wherein the heated injection fluid is heated via heat transfer from a heat transfer fluid that is heated via solar energy.

19. The method of claim 1, wherein the heated injection fluid is heated via heat transfer from a steam generated via solar energy.

20. The method of claim 3, wherein the heated injection fluid is injected into a central region of the hot zone through a plurality of injection wells, and the geothermal brine is recovered from a peripheral region of the hot zone through a plurality of production wells, wherein the peripheral region peripherally surrounds the central region.

21. The method of claim 3, wherein the heated injection fluid is injected into a higher region of the hot zone through a plurality of injection wells, and the geothermal brine is recovered from a lower region of the hot zone through a plurality of production wells, wherein the lower region of the hot zone is deeper than the higher region.

22. The method of claim 3, wherein the heated injection fluid is injected into the hot zone through one or more injection wells, and the geothermal brine is subsequently recovered through the one or more injection wells, such that the one or more injection wells are converted from injection wells into production wells.

23. The method of claim 22, wherein the geothermal brine is recovered within 30 days of the injection of the heated injection fluid.

24. The method of claim 22, wherein the geothermal brine is recovered within 48 hours of the injection of the heated injection fluid.

25. The method of claim 3, wherein the heated injection fluid is injected into and recovered from the hot zone through one or more well sets, each well set comprising at least one injection well and at least one production well, wherein the injection well and the production well in each well set inject the injection fluid into, and recover the geothermal brine from, a single fault block.

26. The method of claim 3, further comprising recovering and condensing steam flashed off the geothermal brine to produce water, heating the water, and injecting the heated water into the geothermal reservoir.

27. The method of claim 3, further comprising recovering and condensing steam flashed off the geothermal brine to produce water, using the water as feed water in a steam generator, and injecting steam generated by the steam generator into the geothermal reservoir.

28. A method for the staged production of hot zones in a geothermal reservoir, the method comprising:
injecting a heated injection fluid into a first zone in a naturally occurring geothermal reservoir containing a natural geothermal brine via one or more first injection wells, wherein the naturally occurring geothermal reservoir has a temperature gradient higher than a normal thermal gradient of the Earth and stores natural geothermal heat within the natural geothermal brine, wherein the enthalpy of a first portion of the natural geothermal brine is increased to create a first hot zone in the geothermal reservoir;
subsequently injecting a heated injection fluid into a second zone, outside of the first zone, in the geothermal reservoir via one or more second injection wells, wherein the enthalpy of at least a portion of the geothermal brine is increased to create a second hot zone in the geothermal reservoir;
storing the heat provided by the heated injection fluid primarily within the heated geothermal brine in the hot zones, wherein the heated geothermal brine stores both the heat provided by the heated injection fluid and a first portion of the natural geothermal heat;
maintaining a temperature differential between the hot zones of the geothermal reservoir and a colder zone of the geothermal reservoir fluidly connected with the hot zones, wherein the colder zone contains a second portion of the natural geothermal brine not heated by the heated injection fluid and stores a second portion of the natural geothermal heat within the second portion of the natural geothermal brine; and
containing heat provided by the heated injection fluid within the hot zones using at least one of the following methods:
 interrupting or reversing an outward migration of heated fluids from the hot zones by recovering at least one of the increased enthalpy brine and the heated injection fluid from the hot zones via one or more hot zone production wells, wherein the hot zone production wells are configured to operate independently from the injection wells and are capable of producing the recovered fluid without requiring a simultaneous addition of fluid to the geothermal reservoir,
 periodically reversing the outward migration of the heated fluids from the hot zones by converting the injection wells into hot zone production wells and using the converted hot zone production wells to recover at least one of the increased enthalpy brine and the heated injection fluid from the hot zones, wherein the converted hot zone production wells are capable of producing the recovered fluid without requiring a simultaneous addition of fluid to the geothermal reservoir, and
 using one or more fresh geothermal brine production wells located outside boundaries of the hot zones to create an inward flow of the natural geothermal brine toward the hot zones from a surrounding portion of the geothermal reservoir, and using the hot zone production wells located at a periphery of the hot zone to create an outward flow of at least one of the increased enthalpy brine and the heated injection fluid from the injection wells toward the periphery of the hot zones.

29. The method of claim 28, further comprising recovering heated geothermal brine from the first hot zone prior to injecting the heated injection fluid into the second hot zone.

30. The method of claim 3, wherein the geothermal brine is recovered from the naturally occurring geothermal reservoir through a plurality of production wells, at least two of which are configured to recover geothermal brine from the reservoir at different temperatures, different pressures, or both, wherein at least one of the production wells recovers increased enthalpy brine from one of the created hot zones, and further wherein the geothermal brine recovered from each of the at least two production wells is fed separately as a thermal feed into a geothermal power plant.

31. The method of claim 10, wherein the heated injection fluid is heated via a transfer of heat from a heat transfer fluid from a thermal power plant that uses, at least in part, the same type of power cycle as the geothermal power plant, and further wherein power cycle working fluids from the thermal and geothermal power plants are commingled and feed a common power block.

32. A system for increasing the enthalpy of a geothermal brine, the system comprising:
a naturally occurring geothermal reservoir containing a natural geothermal brine, wherein the naturally occurring geothermal reservoir has a temperature gradient higher than a normal thermal gradient of the Earth and stores natural geothermal heat within the natural geothermal brine, the geothermal reservoir comprising a hot zone and a colder zone fluidly connected with the hot zone, wherein the geothermal reservoir is configured to maintain a temperature differential between the hot zone and the colder zone;
at least one hot zone injection well configured to inject a sub-critical heated injection fluid into the geothermal reservoir to create the hot zone in the geothermal reservoir, wherein the geothermal reservoir is configured to store heat provided by the heated injection fluid primarily within the geothermal brine in the hot zone, wherein the geothermal brine in the hot zone stores both the heat provided by the heated injection fluid and a first portion of the natural geothermal heat, wherein the colder zone contains a second portion of the natural geothermal brine not heated by the heated injection fluid and stores a second portion of the natural geothermal heat within the second portion of the natural geothermal brine;
at least one production well configured to recover geothermal brine from the hot zone of the geothermal reservoir, wherein the at least one hot zone injection well and the at least one production well are configured to contain the heat provided by the heated injection fluid within the hot zone using at least one of the following methods:
 interrupting or reversing an outward migration of heated fluids from the hot zone by recovering at least one of the increased enthalpy brine and the heated injection fluid from the hot zone via one or more hot zone production wells, wherein the hot zone production wells are configured to operate independently from the injection wells and are capable of producing the recovered fluid without requiring a simultaneous addition of fluid to the geothermal reservoir,
 periodically reversing the outward migration of the heated fluids from the hot zone by converting the injection wells into hot zone production wells and using the converted hot zone production wells to recover at least one of the increased enthalpy brine and the heated injection fluid from the hot zone, wherein the converted hot zone production wells are capable of producing the recovered fluid without requiring a simultaneous addition of fluid to the geothermal reservoir, and using one or more fresh geothermal brine production wells located outside the boundaries of the hot zone to create an inward flow of the natural geothermal brine toward the hot zone from a surrounding portion of the geothermal reservoir, and using the hot zone production wells located at a periphery of the hot zone to create an outward flow of at least one of the increased enthalpy brine and the heated injection fluid from the injection wells toward the periphery of the hot zone; and a source of sub-critical heated injection fluid in fluid communication with the at least one hot zone injection well.

33. The system of claim 32, wherein the source of sub-critical heated injection fluid comprises a source of heated natural geothermal brine that has been previously recovered from the naturally occurring geothermal reservoir.

34. The system of claim 33, further comprising a source of at least one of heated pressurized water or steam.

35. The system of claim 32, further comprising a geothermal power plant configured to accept geothermal brine recovered from the geothermal reservoir as a thermal feed.

36. The system of claim 35, further comprising at least one colder zone injection well configured to inject spent brine from the geothermal power plant into the colder zone in the geothermal reservoir, wherein the colder zone is outside of, and in fluid communication with, the hot zone, such that the injected spent brine is able to migrate into the hot zone and maintain pressure within the geothermal reservoir.

37. The system of claim 32, further comprising a thermal power plant configured to heat an injection fluid to produce the sub-critical injection fluid via heat transfer from a heat transfer fluid.

38. The system of claim 35, further comprising a thermal power plant configured to heat an injection fluid to produce the sub-critical injection fluid via heat transfer from a heat transfer fluid.

39. The system of claim 37, wherein the thermal power plant is a solar thermal power plant.

40. The system of claim 35, wherein the system comprises a plurality of production wells, at least two of which are configured to recover geothermal brine at different temperatures, different pressures, or both, and further wherein the geothermal power plant is configured accept geothermal brine recovered from each of the at least two production wells as a separate thermal feed.

41. The system of claim 38, wherein the thermal power plant and the geothermal power plant are configured to use, at least in part, the same type of power cycle, and are further configured to commingle their power cycle working fluids and feed said power cycle working fluids into a common power block.

42. A method for increasing the enthalpy of a natural geothermal brine and producing the increased enthalpy geothermal brine from a natural geothermal reservoir, the method comprising:

injecting a heated injection fluid into a natural geothermal reservoir containing a natural geothermal brine through an injection well, wherein the natural geothermal reservoir has a temperature gradient higher than a normal thermal gradient of the Earth and stores natural geothermal heat within the natural geothermal brine;

storing the heat provided by the heated injection fluid primarily within the increased enthalpy geothermal brine in a region of the natural geothermal reservoir surrounding the injection well, wherein the increased enthalpy geothermal brine stores both the heat provided by the heated injection fluid and a first portion of the natural geothermal heat;

maintaining a temperature differential between the region of the natural geothermal reservoir surrounding the injection well and a colder geothermal heat recovery zone of the geothermal reservoir fluidly connected with the region of the natural geothermal reservoir surrounding the injection well, wherein the geothermal heat recovery zone contains a second portion of the natural geothermal brine not heated by the heated injection fluid and stores a second portion of the natural geothermal heat within the second portion of the natural geothermal brine;

containing the heated injection fluid within the region of the natural geothermal reservoir surrounding the injection well by converting the injection well into a production well, thereby reversing an outward flow of the heated injected fluid from the injection well and generating an inward flow of the heated injection fluid and the increased enthalpy geothermal brine toward the converted production well; and subsequently recovering geothermal brine from the geothermal reservoir through the converted production well, wherein the converted production well is capable of producing the recovered fluid without requiring a simultaneous addition of fluid to the geothermal reservoir.

43. The method of claim 42, wherein the geothermal brine is recovered within 30 days of the injection of the heated injection fluid.

44. The method of claim 1, where the heated injection fluid is heated using heat removed from thermal energy storage.

45. The method of claim 44, where thermal energy storage is storing heat taken from a thermal power plant.

46. The method of claim 44, where the thermal energy storage is storing heat converted from concentrated solar energy.

47. The method of claim 44, where higher temperature heat is removed from thermal energy storage and used in a thermal power plant, followed by removing intermediate temperature heat used to heat the injection fluid(s).

48. The method of claim 47, where higher temperature heat is used to supplement lower temperature thermal feed in a geothermal power plant.

49. The method of claim 6, further comprising using a pressure vessel to maintain an enthalpy of the natural geothermal brine recovered from the naturally occurring geothermal reservoir prior to heating the recovered natural geothermal brine to generate the heated injection fluid.

* * * * *